United States Patent
Grobe et al.

(10) Patent No.: US 9,197,349 B2
(45) Date of Patent: Nov. 24, 2015

(54) METHOD OF OPERATING A PRIMARY OPTICAL NODE AND A SECONDARY OPTICAL NODE

(71) Applicant: ADVA Optical Networking SE, Martinsried/Munich (DE)

(72) Inventors: Klaus Grobe, Planegg (DE); Markus Roppelt, Karlsruhe (DE)

(73) Assignee: ADVA OPTICAL NETWORKING SE (DE)

( * ) Notice: Subject to any disclaimer, the term of this patent is extended or adjusted under 35 U.S.C. 154(b) by 204 days.

(21) Appl. No.: 13/896,839

(22) Filed: May 17, 2013

(65) Prior Publication Data

US 2013/0336655 A1    Dec. 19, 2013

(30) Foreign Application Priority Data

Jun. 15, 2012    (EP) .................................... 12172216

(51) Int. Cl.
*H04J 14/00*    (2006.01)
*H04J 14/02*    (2006.01)

(52) U.S. Cl.
CPC ........... *H04J 14/0227* (2013.01); *H04J 14/025* (2013.01); *H04J 14/0246* (2013.01);
(Continued)

(58) Field of Classification Search
CPC . H04J 14/025; H04J 14/0226; H04J 14/0246; H04J 14/0282; H04J 14/0227; H04J 14/0232; H04J 14/0238; H04J 14/0252; H04J 14/02; H04J 14/0221; H04J 14/0247; H04J 14/0258; H04J 14/0267; H04J 14/0284; H04J 14/0257; H04B 10/272; H04L 45/02; H04L 45/62; H04Q 11/0062; H04Q 11/0067; H04Q 2011/0073; H04Q 2011/0079; H04Q 2011/0086; H04Q 2011/0088
See application file for complete search history.

(56) References Cited

U.S. PATENT DOCUMENTS

2007/0092256 A1*  4/2007  Nozue ................. H04J 14/0282
                                                              398/72
2008/0267627 A1*  10/2008  Effenberger ......... H04B 10/272
                                                              398/72
(Continued)

FOREIGN PATENT DOCUMENTS

WO    2010064981 A1    6/2010

OTHER PUBLICATIONS

Gerstel, Ori, "Flexible Use of Spectrum and Photonic Grooming",2010, Cisco, 32 HaMelachn St., P.O. Box 8735, I.Z.Sapir, Netnya 42504, Israel, ogerstel@cisco.com, XP:55024977A.

*Primary Examiner* — Danny Leung
(74) *Attorney, Agent, or Firm* — Donald R. Boys; Central Coast Patent Agency, Inc.

(57) ABSTRACT

The invention relates to a method of operating a primary optical node, particularly an optical line terminal (OLT), for an optical communications system, wherein said OLT is configured to receive at least one upstream optical signal (uos) from at least one secondary optical node, particularly an optical networking unit (ONU), within at least a first wavelength range (wr1), and to transmit at least one downstream optical signal (dos) to said at least one ONU within at least a second wavelength range (wr2), wherein said OLT determines a currently unused wavelength subrange (wsr2) within said first wavelength range (wr1), assigns a specific target wavelength ($\lambda t$) within said currently unused wavelength subrange (wsr2) to said ONU, signals said target wavelength ($\lambda t$) to said ONU, receives an upstream signal (us) from said ONU, and provides feedback information to said ONU.

19 Claims, 8 Drawing Sheets

(52) U.S. Cl.
CPC ......... *H04J14/0257* (2013.01); *H04J 14/0267* (2013.01); *H04J 14/0282* (2013.01); *H04J 14/0232* (2013.01); *H04J 14/0272* (2013.01); *H04J 14/0276* (2013.01)

(56) References Cited

U.S. PATENT DOCUMENTS

| | | | | |
|---|---|---|---|---|
| 2009/0116836 A1* | 5/2009 | Bernstein | ............ | H04J 14/0227 398/51 |
| 2009/0202245 A1* | 8/2009 | Bouda | ................. | H04J 14/0226 398/76 |
| 2011/0236017 A1* | 9/2011 | Ohlen | ................. | H04J 14/0282 398/34 |
| 2012/0070146 A1* | 3/2012 | Hinderthuer | ...... | H04B 10/07957 398/13 |
| 2012/0219287 A1* | 8/2012 | Treyer | ................. | H04J 14/0278 398/27 |
| 2012/0328296 A1* | 12/2012 | Sullivan | ................ | H04J 14/026 398/79 |
| 2013/0336655 A1* | 12/2013 | Grobe | ................ | H04J 14/0246 398/67 |

\* cited by examiner

METHOD OF OPERATING A PRIMARY OPTICAL NODE AND A SECONDARY OPTICAL NODE

CROSS-REFERENCE TO RELATED APPLICATIONS

The present application claims priority to European application EP 12 172216.9-1327, filed Jun. 15, 2012. All disclosure of that application is incorporated in the present application at least by reference.

BACKGROUND OF THE INVENTION

1. Field of the Invention

The present invention is in the technical field of optical communication.

2. Description of Related Art

Prior art optical transmission systems comprising a primary optical node and at least one secondary optical node require complex and costly components not only at the primary optical node but also at the secondary optical nodes in order to ensure a precise setting of especially upstream transmission wavelengths and downstream receive filter equipment.

Accordingly, it is an object of the present invention to provide an improved primary optical node, particularly an optical line terminal, OLT, for an optical communications system, which enables an efficient wavelength tuning with a plurality of secondary optical nodes, e.g. ONUs, without requiring complex hardware such as wavelength lockers and the like at the ONUs.

BRIEF SUMMARY OF THE INVENTION

In a preferred embodiment of the present invention a method is provided for operating a primary optical node, particularly an optical line terminal (OLT), for an optical communications system. The OLT is configured to receive at least one upstream optical signal (uos) from at least one secondary optical node, particularly an optical networking unit (ONU), within at least a first wavelength range (wr1), and to transmit at least one downstream optical signal (dos) to said at least one ONU within at least a second wavelength range (wr2). The OLT determines a currently unused wavelength subrange (wsr2) within said first wavelength range (wr1), assigns a specific target wavelength ($\lambda t$) within said currently unused wavelength subrange (wsr2) to said ONU, signals said target wavelength ($\lambda t$) to said ONU, receives an upstream signal (us) from said ONU, and provides feedback information to said ONU.

DETAILED DESCRIPTION OF THE INVENTION

Figure 1:
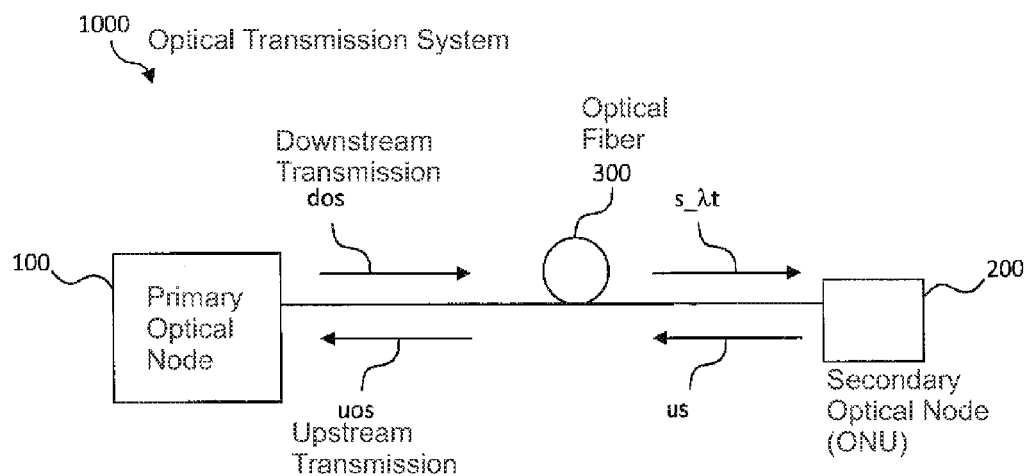
FIG. 1 depicts a schematic block diagram of an optical transmission system according to an embodiment.

The present invention relates to a method of operating a primary optical node, particularly an optical line terminal (OLT) for an optical communications system, wherein said OLT is configured to receive at least one upstream optical signal from at least one secondary optical node, particularly optical networking unit, ONU, within at least a first wavelength range, and to transmit at least one downstream optical signal to said at least one ONU within at least a second wavelength range.

The present invention further relates to a primary optical node, particularly an optical line terminal, (OLT) for an optical communications system. The present invention further relates to a method of operating a secondary optical node, particularly optical networking unit (ONU), and to an ONU. The present invention further relates to an optical communications system comprising a primary node, particularly OLT, and at least one secondary node, particularly ONU, and to a method of operating an optical communications system.

Also, it is an object of the present invention to provide an improved method of operating a primary optical node.

It is a further object of the present invention to provide an improved secondary optical node, particularly an optical network unit (ONU) for an optical communications system, which enables an efficient wavelength tuning with respect to a OLT, without requiring complex hardware such as wavelength lockers and the like at the ONU.

Also, it is an object of the present invention to provide an improved method of operating a secondary optical node.

Further, it is an object of the present invention to provide an improved optical communications system comprising a primary node and at least one secondary node and an improved method of operating such optical communications system.

Regarding the OLT, the above referenced object of the present invention is achieved in that said OLT determines a currently unused wavelength subrange within said first wavelength range, assigns a specific target wavelength within said currently unused wavelength subrange to said ONU, signals said target wavelength to said ONU, receives an upstream signal from said ONU, and provides feedback information to said ONU which comprises information on at least one of: (a) an actual wavelength and/or wavelength channel of said upstream signal from said ONU, (b) an indication whether said actual wavelength of said upstream signal is within a predetermined wavelength range with respect to the target wavelength.

The inventive principle has the advantage that the OLT can determine a sufficiently large currently unused wavelength subrange within the wavelength range available for upstream communications with the OLT so that the ONU is not required to have high precision tuning capabilities for its laser source that generates the laser signal used for upstream communications. Rather, the ONU may be equipped with a comparatively simple and low-cost tunable laser device such as a tunable laser diode, TLD, the output wavelength of which may be tuned in a per se known manner, i.e. by controlling respective control currents to the TLD. As long as the currently unused wavelength subrange selected by the OLT for assigning a target wavelength to the ONU is sufficiently large with respect to a tuning precision of the ONU, the ONU may—after receiving its wavelength assignment from the OLT—control its TLD to set its wavelength as precise as possible within said subrange. After that, the ONU may advantageously alter its wavelength to more precisely tune to the target wavelength employing the feedback mechanism offered by the inventive OLT. This way, the OLT according to the embodiments efficiently supports the ONU to attain its assigned target wavelength for upstream optical transmissions to the OLT.

According to an embodiment, the OLT signals said target wavelength to said ONU by using a common ("broadcast") downstream signaling channel or an already configured ONU-specific DL signaling channel on an own wavelength.

Alternatively or in addition, downstream signaling may also be performed in an in-band fashion, i.e. by using layer-1/2 functions.

Preferred embodiments of the invention are used in a wavelength division multiplexing (WDM) passive optical network (PON) implementing a point-to-multipoint topology wherein one primary optical network element, i.e. the OLT, serves a plurality of secondary optical network elements, i.e. the ONUs. As is per se known, the OLT may be located in a central office, whereas ONUs typically are located at the subscribers' premises. Also, both CWDM (coarse WDM) and/or DWDM (dense WDM) may be used in combination with the present invention. However, the inventive principle is not limited to WDM PONs, but may also be used in optical point-to-point communications with a single primary node and a single secondary node.

According to an advantageous embodiment, said OLT, preferably periodically, transmits downstream signaling to one or more ONUs, in at least one predetermined wavelength channel within said second wavelength range, wherein said at least one predetermined wavelength channel preferably corresponds with an edge of said second wavelength range. For example, according to one embodiment, the OLT is configured to receive upstream optical signals from at least one ONU within a first wavelength range that corresponds to the optical C-band, i.e. in a wavelength range ranging from about 1530 nm (nanometer) to about 1565 nm.

According to a further embodiment, the OLT is configured to transmit at least one downstream optical signal to said at least one ONU within at least a second wavelength range, said second wavelength range corresponding to the optical L-band ranging from about 1565 nm to about 1625 nm.

The above mentioned downstream signaling may thus e.g. be performed on a lowest wavelength channel within said L-band, i.e. at a wavelength of about 1565 nm thus keeping the remaining L-band wavelength channels available for further downlink transmissions, such as e.g. specific signaling or data purposes to single ONUs.

Alternatively or in addition to the lowest wavelength channel within said L-band, the highest wavelength channel within said L-band may also be used. As a further alternative, any other wavelength channel within the wavelength ranged used for downstream transmission may also be used for the above described downstream signaling. Of course, if another wavelength range is used for downstream transmission, i.e. instead of the optical L-band, one or more suitable wavelength channels of such other wavelength range may be used for downstream signaling. Preferably, a common configuration information is provided to both OLTs and ONUs operated in the same optical network, i.e. PON, which inter alia defines the specific wavelength channel(s) determined to be used for downstream signaling from the OLT to the ONU(s).

Further wavelength ranges, i.e. other than C, L-band may also be used in combination with the inventive principle. The downstream signaling provided by the OLT according to an embodiment may e.g. comprise a pilot tone which may be inserted in a conventional manner by analog or digital modulation of an optical carrier signal associated with the specific wavelength channel(s) determined to be used for downstream signaling. According to a particularly preferred embodiment, the pilot tone comprises a predetermined, dedicated pilot tone frequency also known by the ONU(s), which enables the ONU(s) to efficiently identify the pilot tone sent by the OLT in the course of downstream signaling.

Periodical downstream signaling by the OLT is particularly preferred since it enables power savings compared to a continuous downstream signaling approach. Nevertheless, by choosing a proper periodicity, latencies in wavelength tuning for a new ONU desiring to establish communications with the OLT, which are caused by non-continuous operation, may be kept at an acceptable level.

According to a further advantageous embodiment, said OLT determines an actual wavelength and/or wavelength channel of said upstream signal from said ONU. Thus, the OLT can dynamically assess the actual wavelength as generated by the ONU for upstream communications with the OLT, whereby an efficient feedback mechanism is established that e.g. allows the OLT to signal to the ONU whether the target wavelength as specified by the OLT for the specific ONU has already been reached in the course of wavelength tuning of the ONU's laser source, e.g. TLD. Alternatively or in addition, the OLT may signal, based on said determination of the actual wavelength and/or wavelength channel, the currently tuned wavelength channel associated with the ONU's upstream signal.

Preferably, according to an embodiment, the OLT performs an iterative wavelength tuning process together with an ONU that has been assigned a specific target wavelength for upstream transmissions to the OLT, said iterative wavelength tuning process comprising one or more cycles of the ONU transmitting an upstream signal to the OLT and the OLT assessing the current wavelength of the ONU's upstream signal to the OLT, and the OLT further signaling feedback information depending on said current wavelength back to the ONU. In response to the feedback information of the OLT, the ONU may tune its laser source, e.g. TLD, in order to reduce the wavelength difference between the actual wavelength as assessed and signaled to the ONU by the OLT and the target wavelength.

This iterative wavelength tuning process may e.g. be initiated by the OLT assigning and signaling the respective target wavelength to the ONU. After receiving such signaling, the ONU may—within the limits of its TLD's wavelength precision—at least coarsely set the target wavelength by controlling its laser source, e.g. TLD, and after that, the above mentioned feedback loop may be entered which enables the OLT to perform wavelength measurements as to the actual upstream wavelength used by the ONU and to signal corresponding feedback information to the ONU. The feedback process is preferably maintained as long as the difference between the actual upstream wavelength used by the ONU and the target wavelength as assigned by the OLT exceeds a predetermined threshold, which e.g. corresponds to the WDM techniques applied in the system and/or to further system parameters.

According to a further preferred embodiment, the OLT signals to the ONU that said target wavelength has been reached and/or that a difference between said target wavelength and an actual wavelength of said upstream signal from said ONU is below a predetermined threshold. Advantageously, this is performed by the OLT as soon as wavelength measurements related to the current ONU's upstream wavelength yield a corresponding result, whereby an efficient and fast wavelength tuning process is enabled.

According to a further preferred embodiment, the step of assigning a specific target wavelength within said currently unused wavelength subrange to said ONU comprises assigning the highest or lowest currently unused wavelength within said currently unused wavelength subrange as said specific target wavelength, which ensures an efficient usage of the currently unused wavelength subrange and which minimizes wavelength fragmentation thus avoiding the creation of a plurality of comparatively small unused wavelength subranges. The embodiment rather enables to maintain a comparatively large contiguous wavelength subrange of (still) unused wavelength channels, which is very advantageous since efficient wavelength tuning according to the inventive principle without disturbing other ONU's upstream communications is enabled for further ONUs.

According to a further preferred embodiment, the OLT signals a downstream target wavelength to the ONU which is to be used for future downstream communications from said OLT to said ONU, wherein said signaling of the downstream target wavelength itself may e.g. be performed via the above mentioned downstream signaling channel, i.e. the at least one predetermined wavelength channel within said second wavelength range used by the OLT for downstream communications. Thus, initial downstream signaling to a ONU may be performed on the commonly known downstream signaling wavelength, or wavelength channel, respectively. However, for future downstream transmissions, the OLT may assign an individual downstream target wavelength to a specific ONU which will be used by the OLT for future downstream transmissions to said ONU. The ONU may, upon receiving the downstream target wavelength signaling from the OLT, tune its input filters to the respective wavelength to be able to properly receive future downstream communications from the OLT on the signaled individual downstream target wavelength. Once this ONU-specific downstream communications channel is established, the OLT is not required to use the/a common downstream signaling channel for downstream communications to the ONU, but may rather use the ONU-specific downstream communications channel.

Prior to signaling a downstream target wavelength to the ONU which is to be used for future downstream communications from said OLT to said ONU, the OLT may assign a specific downstream target wavelength to the ONU, either using known techniques or using a technique as also provided by the inventive principle and as already described above in the context of assigning a target wavelength for upstream communications: the OLT may determine a currently unused wavelength subrange in said second wavelength range that may be used for downstream communications with the ONU(s). Specifically, the OLT may advantageously assign the highest or lowest currently unused wavelength within said currently unused wavelength subrange in said second wavelength range as said specific target wavelength for downstream communications with a specific ONU, which prevents fragmentation of the downstream wavelength range.

According to a further preferred embodiment, the OLT may signal both a target wavelength for upstream communications with an ONU and a target wavelength for downstream communications with an ONU in the same signaling process, e.g. via a common downstream signaling wavelength/wavelength channel which may be provided at a lowest wavelength channel within said L-band (if the L-band is used for downstream communications), i.e. at a wavelength of about 1565 nm.

According to a further preferred embodiment, the OLT signals to one or more ONUs to enter a delayed tuning mode, in which a specific ONU delays its next upstream communication to the OLT on a random and/or pseudo-random basis. This is particularly useful if more than one ONU is trying to initiate upstream communications on a (potentially) commonly used upstream wavelength simultaneously. For example, each ONU of the optical transmission system may be configured to use a commonly known wavelength for initial upstream communications to the OLT, which is monitoring said commonly known wavelength in order to detect new ONUs. If two or more ONUs start upstream data transmissions, i.e. for the purpose of initializing a communications process with the OLT, simultaneously or at least in an overlapping manner, most probably, the individual data transmissions of the ONUs will be at least partly corrupted, which can be recognized by the OLT. In this case, the OLT may issue a "delayed tuning mode" command to the ONUs, i.e. on the common downlink signaling channel. Upon receiving said "delayed tuning mode" command, each ONU enters the delayed tuning mode which provides that the ONU determines a time delay on a random and/or pseudo-random basis, wherein said time delay defines how long the ONU has to wait before it may start a next upstream data transmission to the OLT on the commonly used upstream wavelength. This way, the probability that the next initial upstream data transmissions of several ONUs to the OLT will overlap, is significantly reduced, which facilitates efficient initialization of communications with the OLT for the involved ONUs.

According to a further preferred embodiment, the OLT performs a process of wavelength defragmentation, which comprises re-assigning individual wavelengths to respective ONU(s) with the aim of creating or increasing the size of at least one wavelength subrange that comprises a plurality of contiguous unassigned wavelengths. The process of wavelength defragmentation may be performed both for upstream and/or downstream wavelength ranges or subranges thereof and advantageously enables to maintain wavelength subranges with a plurality of contiguous unassigned wavelengths. This is particularly useful in combination with the inventive aspect of wavelength tuning of ONUs, where it is beneficial if at least one wavelength range used for upstream transmissions, i.e. from ONUs to the OLT, comprises unused wavelength subranges that may serve as "tuning range" for an ONU that is currently tuning in. I.e., the process of wavelength defragmentation enables to create or maintain free wavelength subranges that may advantageously be used for the inventive aspect of tuning the ONU's upstream signal wavelengths, which avoids interference between a ONU currently tuning in and ongoing upstream transmissions of further ONUs. Although the wavelength defragmentation is particularly beneficial for upstream wavelength ranges because it facilitates ONU tuning, it may also be applied to downstream wavelength ranges to simplify wavelength management at the OLT. Wavelength fragmentation may e.g. occur if individual upstream and/or downstream wavelengths are not used any more, for example if individual ONUs are deactivated. According to an embodiment, the defragmentation process may be initiated by the OLT periodically, i.e. after a predetermined time of e.g. 1 minute, 10 minutes or the like. To reduce signaling overhead and the like, preferably, larger delays of about 1 hour or the like are also contemplated before a new defragmentation process is started by the OLT.

According to a further embodiment, the defragmentation process may also be initiated by the OLT if a predetermined quality measure which characterizes the degree of fragmentation of at least one wavelength range exceeds a predetermined threshold. Such quality measure may e.g. reflect the number of contiguous free wavelengths/wavelength channels in the respective wavelength range, and the like. Initiating defragmentation depending on a combination of several criteria such as a predetermined time delay and a degree of fragmentation is also possible.

According to a further embodiment, a wavelength defragmentation process may also be initiated by an OLT upon receiving a signaling from an ONU which notifies the OLT that the respective ONU will soon be deactivated. Such signaling may also be referred to as "dying gasp", because it is one of the last signals or the last signal sent from the respective ONU to the OLT.

According to a further embodiment, the OLT may also indicate status information related to a planned and/or an ongoing wavelength defragmentation process, preferably on a common downstream wavelength channel, so that ONUs may get aware of the actual defragmentation status of the OLT. Upon evaluating this status information related to defragmentation provided by the OLT, a specific ONU may decide to initiate upstream communications with the OLT instantly or to wait, e.g. for the end of a planned or ongoing defragmentation process, which may also be signaled by the OLT to the ONU(s).

According to a further embodiment, the wavelength defragmentation may start with a highest used wavelength channel to be defragmented, which may e.g. be shifted-up from its current wavelength to a higher free wavelength. Preferably, scheduled by the OLT, one used wavelength channel after the other is shifted to a new wavelength to form a contiguous block of used wavelengths, whereby error bursts may be minimized.

A further solution to the object of the present invention is given by a primary optical node, particularly an optical line terminal, OLT, for an optical communications system, wherein said OLT is configured to receive at least one upstream optical signal from at least one secondary optical node, particularly optical networking unit, ONU, within at least a first wavelength range, and to transmit at least one downstream optical signal to said at least one ONU within at least a second wavelength range, wherein said OLT is configured to: determine a currently unused wavelength subrange within said first wavelength range, assign a specific target wavelength within said currently unused wavelength subrange to said ONU, signal said target wavelength to said ONU, receive an upstream signal from said ONU, and to provide feedback information to said ONU which comprises information on at least one of: (a) an actual wavelength and/or wavelength channel of said upstream signal from said ONU, (b) an indication whether said actual wavelength of said upstream signal is within a predetermined wavelength range with respect to the target wavelength.

According to a preferred embodiment, the OLT is configured to perform the method according to the embodiments.

A further solution to the object of the present invention is given by a method of operating a secondary optical node, particularly an optical network unit, ONU, for an optical communications system, wherein said ONU is configured to transmit at least one upstream optical signal to at least one primary optical node, particularly optical line terminal, OLT, within at least a first wavelength range, and to receive at least one downstream optical signal from said OLT within at least a second wavelength range, wherein said ONU receives from said OLT a target wavelength which is to be used by the ONU for future upstream communications with the OLT, sets a first output wavelength of a tunable laser light source of the ONU, preferably depending on said target wavelength, transmits said upstream signal to said OLT using said first output wavelength, and receives feedback information from said OLT which comprises information on at least one of: (a) an actual wavelength and/or wavelength channel of said upstream signal, (b) an indication whether said actual wavelength of said upstream signal is within a predetermined wavelength range with respect to the target wavelength.

According to a preferred embodiment, said ONU tunes, i.e. alters, said first output wavelength of its tunable laser light source depending on said feedback information received from the OLT. Thus, the ONU advantageously makes use of the feedback information provided by said OLT. Tuning in the sense of the present embodiment may comprise increasing or decreasing the output wavelength of the ONU's laser light source, either by a minimum possible amount which is usually defined by the system's precision regarding the setting of e.g. electric currents provided as tuning signal to the laser light source, or by increasing or decreasing the wavelength by larger amounts, i.e. in steps of predetermined wavelength difference.

According to an embodiment, the OLT's feedback information may also comprise information on a difference between the actual wavelength output by the ONU's laser light source and the target wavelength, or information that enables the ONU to determine the difference between the actual wavelength output by the ONU's laser light source and the target wavelength. In this case, the ONU may also take into consideration said wavelength difference for further tuning its output wavelength.

According to a further embodiment, the ONU sets said first output wavelength of its tunable laser light source to a predetermined initial output wavelength, wherein a difference between said target wavelength and said predetermined initial output wavelength is greater or equal than a first threshold value. According to an embodiment, the first threshold value—which may be commonly known throughout the system, i.e. by OLT and ONUs, or which may be signaled by the OLT by downstream signaling—is chosen such that—under consideration of a potentially low precision regarding the setting of its wavelength—the first output wavelength of the ONU, which is initially set by the ONU, is sufficiently different from the target wavelength. This ensures, especially in cases where the target wavelength is close to already used wavelengths for other ONUs, that the currently considered ONU can tune in, i.e. iteratively alter its wavelength, starting from the predetermined initial output wavelength, to the target wavelength, without erroneously setting its wavelength to a range that is already used thus causing interference with other ONUs.

According to a further advantageous embodiment, said ONU sweeps its output wavelength starting from said initial output wavelength in direction of said target wavelength. In the course of sweeping, a presently unused wavelength subrange as determined by the OLT in the course of assigning the target wavelength (preferably at an edge of a currently unused wavelength subrange), cf. the embodiments disclosed above, is advantageously employed for wavelength tuning of the ONU's laser light source. Thus, a comparatively simple and low-cost laser light source may be used at the ONU keeping system costs and complexity low.

According to an embodiment, wavelength tuning, by means of sweeping, may be performed in either direction, i.e. to higher wavelengths or to lower wavelengths with respect to the predetermined initial output wavelength. The sweeping direction depends on the target wavelength as assigned and signaled to the ONU by the OLT and on the predetermined initial output wavelength, which may also be signaled by the OLT or which may be commonly known in the system, i.e. by configuration prior to deployment. Generally, "sweeping", i.e. altering the output wavelength, is not limited to continuously altering the output wavelength. It may rather also be altered, i.e. increased or decreased by predetermined wavelength steps.

According to an embodiment, the tuning process of the ONU's output wavelength for upstream communications to the OLT is terminated as soon as the current output wavelength is sufficiently close (i.e., within a predetermined second threshold) to the target wavelength. After this tuning process, which may be considered a primary or "coarse" tuning process, the ONU may perform, preferably continuously, a secondary or "fine" tuning process, which is advantageously also assisted by the OLT in the sense of provisioning of feedback regarding an actual output wavelength of the ONU's laser light source.

According to a further preferred embodiment, the ONU sets said initial output wavelength to a wavelength value that is outside said first wavelength range. Thus it is guaranteed, that no further ONUs and their corresponding upstream transmissions in said first wavelength range are disturbed. In some configurations, the OLT may comprise an AWG (arrayed waveguide grating) filter in its receiver array, which is configured to cut off wavelengths exceeding the considered operating wavelength range. Thus, the initial ONU wavelength cannot be received by the OLT's receivers.

According to an embodiment, the OLT advantageously comprises tapping means which tap an upstream signal arriving at an optical input port of the OLT, and wavelength analyzing means which are configured to determine a wavelength of a received upstream signal, such as e.g. the upstream signal as provided by an ONU according to the embodiments in the course of wavelength tuning, so that the OLT can determine an actual wavelength of the ONU and may provide corresponding feedback to the ONU. In configurations where the optical C-band is used as the first wavelength range, the initial output wavelength used by an ONU may e.g. be set to a value of about 1520 nm to 1525 nm, thus—even under influence of poor wavelength setting capability of the ONU's laser light source—being sufficiently far away from potentially used, i.e. occupied upstream wavelengths. Obviously, setting said initial output wavelength to a wavelength value that is outside said first wavelength range includes setting the value to be above or below the considered first wavelength range, which may depend on the usage/availability of adjacent wavelength ranges such as the optical L-band, for example.

According to a further preferred embodiment, said ONU notifies the OLT that it will soon be deactivated and/or is being deactivated, which enables the OLT to improve its wavelength management. For example, by receiving such signaling from one or more ONUs, the OLT can derive whether a process of wavelength defragmentation is to be initiated.

According to a further preferred embodiment, said ONU tunes tunable optical filter means of an optical receive path of said ONU to a wavelength and/or wavelength channel used by the OLT for downstream transmissions, wherein said step of tuning said tunable optical filter means is preferably performed prior to said step of receiving from said OLT an upstream target wavelength to be used by the ONU for future upstream transmissions to the OLT. Thus, advantageously, an ONU-specific downstream signaling channel between OLT and ONU may be established which may be used for further signaling purposes, i.e. in the course of output wavelength tuning of said ONU. Since the OLT's wavelength setting capabilities may be superior—regarding wavelength precision—compared to the ONU's filter tuning capabilities, thereby, implicitly, the ONU's tunable filter of its optical receive path is "calibrated" to the downstream wavelength used by said OLT. I.e., with this embodiment, the ONU is not required to have a tunable optical filter with a high degree of absolute wavelength calibration or the like. It may rather tune in to the OLT's wavelength, e.g. by a sweeping process, wherein a center wavelength of the tunable filter of the ONU is continuously, or by predetermined steps, altered to finally "find" the downstream wavelength used by the OLT for downstream transmissions to said ONU. The specific downstream wavelength may also be signaled from the OLT to the ONU on a general downstream signaling channel or the like, and only after receiving the information on the specific downstream wavelength via said general downstream signaling channel, the ONU may start tuning its optical filter.

A further solution to the object of the present invention is provided by an optical communications system comprising a primary node, particularly optical line terminal, OLT, and at least one secondary node, particularly an optical network unit, ONU, wherein said OLT and said ONU are configured to exchange data via at least one optical communications channel, preferably an optical fiber, wherein said OLT is configured to receive at least one upstream optical signal from said at least one ONU within at least a first wavelength range, and to transmit at least one downstream optical signal to said at least one ONU within at least a second wavelength range, wherein said OLT is configured to: determine a currently unused wavelength subrange within said first wavelength range, assign a specific target wavelength within said currently unused wavelength subrange to said ONU, signal said target wavelength to said ONU, receive an upstream signal from said ONU, and to provide feedback information to said ONU which comprises information on at least one of: (a) an actual wavelength and/or wavelength channel of said upstream signal from said ONU, (b) an indication whether said actual wavelength of said upstream signal is within a predetermined wavelength range with respect to the target wavelength, wherein said ONU is configured to receive from said OLT said target wavelength which is to be used by the ONU for future upstream communications with the OLT, set a first output wavelength of a tunable laser light source of the ONU, preferably depending on said target wavelength, transmit said upstream signal to said OLT using said first output wavelength, and to receive said feedback information from said OLT which comprises information on at least one of: (a) an actual wavelength and/or wavelength channel of said upstream signal, (b) an indication whether said actual wavelength of said upstream signal is within a predetermined wavelength range with respect to the target wavelength.

A further solution to the object of the present invention is provided by a method of operating an optical communications system according to claim 21. Preferred embodiments of the optical transmission system are used in the context of a wavelength division multiplexing (WDM) passive optical network (PON) implementing a point-to-multipoint topology wherein one OLT serves a plurality of ONUs. In this case, the optical communications channel may e.g. comprise a single optical fiber from the OLT to a remote node (RN) arranged between the OLT and the ONUs. The RN may comprise 1:N splitter/combiner means that split the optical fiber from the OLT to the various ONUs or combine them, respectively, as seen from the ONUs. When applying the inventive principle in an optical distribution network such as a WDM PON, which is based on power splitter means that distribute the downstream signals from the OLT to the ONUs and that combine the upstream signals from the ONUs to the OLT, a broadcast-type scenario is given since there is no physical separation of clients (ONUs) in the wavelength domain. In this context, the inventive principle is particularly advantageous, since it helps to avoid so-called "rogue" tune-in scenarios known from conventional systems, where a new ONU seeking to initialize communications with the OLT may disturb existing ONUs and their upstream transmissions to the OLT during tune-in by accidentally setting the ONU's output wavelength to already used wavelength(s).

A further particular advantage of the inventive principle is the fact that no a-priori knowledge of ONU-wavelength assignments is required, since the inventive principle enables a dynamic wavelength assignment to ONUs. Moreover, the application of the inventive principle does not require the laser light sources of ONUs to have any wavelength references. Therefore, comparatively low-cost laser light sources may be provided in the ONUs. Further, tunable filters of the ONUs are neither required to have any wavelength references, because the OLT according to the embodiments signals a ONU-specific downstream wavelength to be used for downstream transmissions in future to the ONU, and the ONU may tune in its tunable filter of an optical reception path until a pilot tone transmitted by the OLT in the respective downstream wavelength is identified by the ONU.

Further features, aspects and advantages of the present invention are presented in the following detailed description with reference to the drawings.

FIG. 1 depicts a schematic block diagram of an optical transmission system 1000 according to an embodiment of the present invention. According to the present embodiment, the optical transmission system 1000 is configured as a WDM PON, i.e. a passive optical network that uses wavelength division multiplexing. The optical transmission system 1000 comprises a primary optical node 100, which operates as optical line terminal (OLT), and at least one secondary optical node 200, which operates as optical network unit, ONU. Further ONUs may also be provided, but are not shown in FIG. 1 for the sake of clarity.

Although the inventive principle is not limited to this type and topology of an optical communications network 1000, the further detailed description mainly refers to WDM PONs. Alternatively, the inventive principle may also be applied to optical point-to-point connections and the like.

The optical transmission system 1000 depicted by FIG. 1 comprises an optical fiber 300, which may e.g. be a single optical fiber, which implements a bidirectional optical communications channel. Both the OLT 100 and the ONU(s) 200 may use the optical fiber 300 for data transmissions to each other. Optical data transmissions from the OLT 100 to the ONU 200 are referred to as downstream transmissions; they are symbolized by the arrow dos in FIG. 1. Optical data transmissions from the ONU 200 to the OLT 100 are referred to as upstream transmissions; they are symbolized by the arrow us in FIG. 1.

Upstream and downstream data transmissions may e.g. be performed in different wavelength ranges via said optical fiber 300. As an example, said OLT 100 is configured to receive at least one upstream optical signal uos from said ONU 200 within at least a first wavelength range, and to transmit at least one downstream optical signal dos to said at least one ONU 200 within at least a second wavelength range, which is different from said first wavelength range. In the present example, the first and second wavelength ranges do not overlap.

Figure 2:
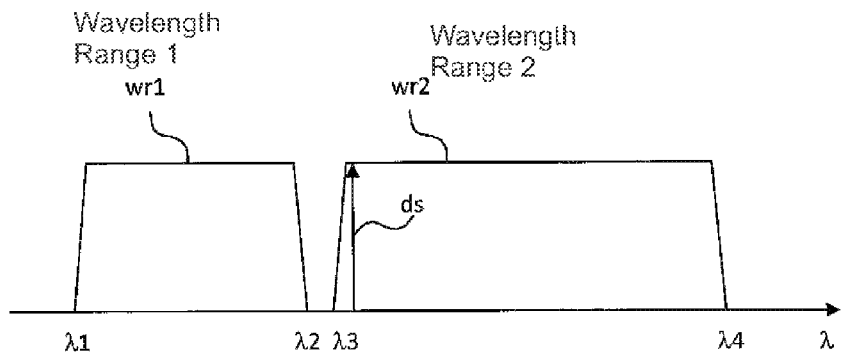
FIG. 2 schematically depicts wavelength ranges used by an optical transmission system according to an embodiment.

FIG. 2 schematically depicts the first and second wavelength ranges wr1, wr2 along a wavelength axis $\lambda$ used by the optical transmission system 1000 according to an embodiment. The first wavelength range wr1 starts at a wavelength $\lambda 1$ and extends to a wavelength $\lambda 2 > \lambda 1$. The second wavelength range wr2 starts at a wavelength $\lambda 3 > \lambda 2$ and extends to a wavelength $\lambda 4 > \lambda 3$. According to a particularly preferred embodiment, the first wavelength range wr1 corresponds to the optical C-band, i.e. a wavelength range ranging from about $\lambda 1 = 1530$ nm (nanometer) to about $\lambda 2 = 1565$ nm. According to a further particularly preferred embodiment, the second wavelength range wr2 corresponds to the optical L-band, i.e. a wavelength range ranging from about $\lambda 3 = 1565$ nm to about $\lambda 4 = 1625$ nm.

Figure 5:
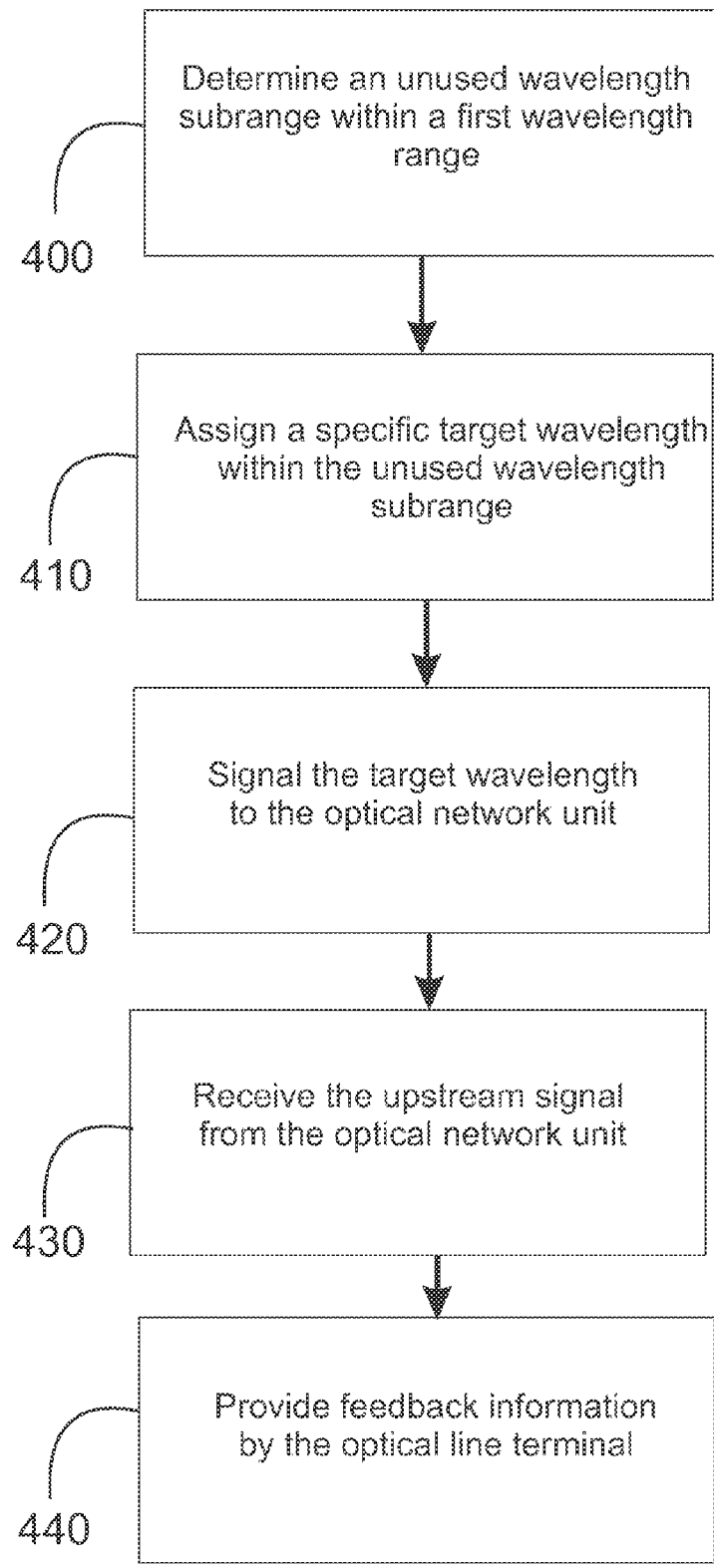
FIG. 5 depicts a simplified flow chart of a method of operating a primary optical node according to an embodiment.

One aspect of the present invention relates to a method of operating a primary optical node, i.e. the OLT 100. A simplified flow-chart of the method of the OLT 100 according to an embodiment is depicted by FIG. 5.

Figure 3A:
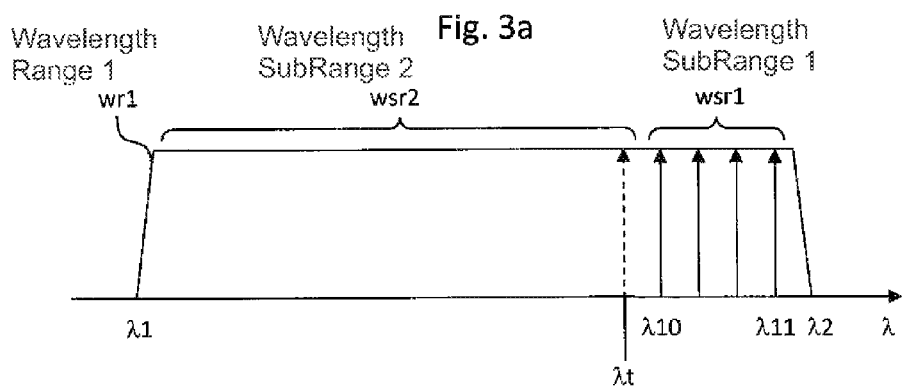
FIG. 3a schematically depicts details of a wavelength range used for upstream communications in an optical transmission system according to an embodiment.

In a first step 400, the OLT 100 (FIG. 1) determines a currently unused wavelength subrange within said first wavelength range wr1, which is used for receiving upstream optical signals uos, us from the ONU(s) 200. In this context, FIG. 3a depicts a detailed view of the first wavelength range wr1 according to FIG. 2. As can be seen from FIG. 3a, within an upper wavelength subrange wsr1 of the first wavelength range wr1, a number of wavelengths or wavelength channels, respectively, between the wavelengths $\lambda 10$ and $\lambda 11$ is already assigned to other ONUs (not depicted) and thus not available for assigning to a new ONU 200 trying to establish a communication with the OLT 100 (FIG. 1). Presently, the upper wavelength subrange wsr1 comprises four wavelength channels, which are symbolized by the vertical arrows of FIG. 3a, and which cannot be assigned to a new ONU 200 since they are currently used. However, a further wavelength subrange wsr2 of the first wavelength range wr1 (FIG. 3a) is presently unused, i.e. there are no wavelength channels in the wavelength range between $\lambda 1$ and $\lambda t$. Thus, in the course of step 400 (FIG. 5), i.e. when determining a currently unused wavelength subrange within said first wavelength range wr1, the OLT 100 (FIG. 1) identifies wavelength subrange wsr2 as an unused wavelength subrange, which may e.g. be used for wavelength assignments for upstream transmissions of further ONUs such as ONU 200 (FIG. 1).

Figure 4:
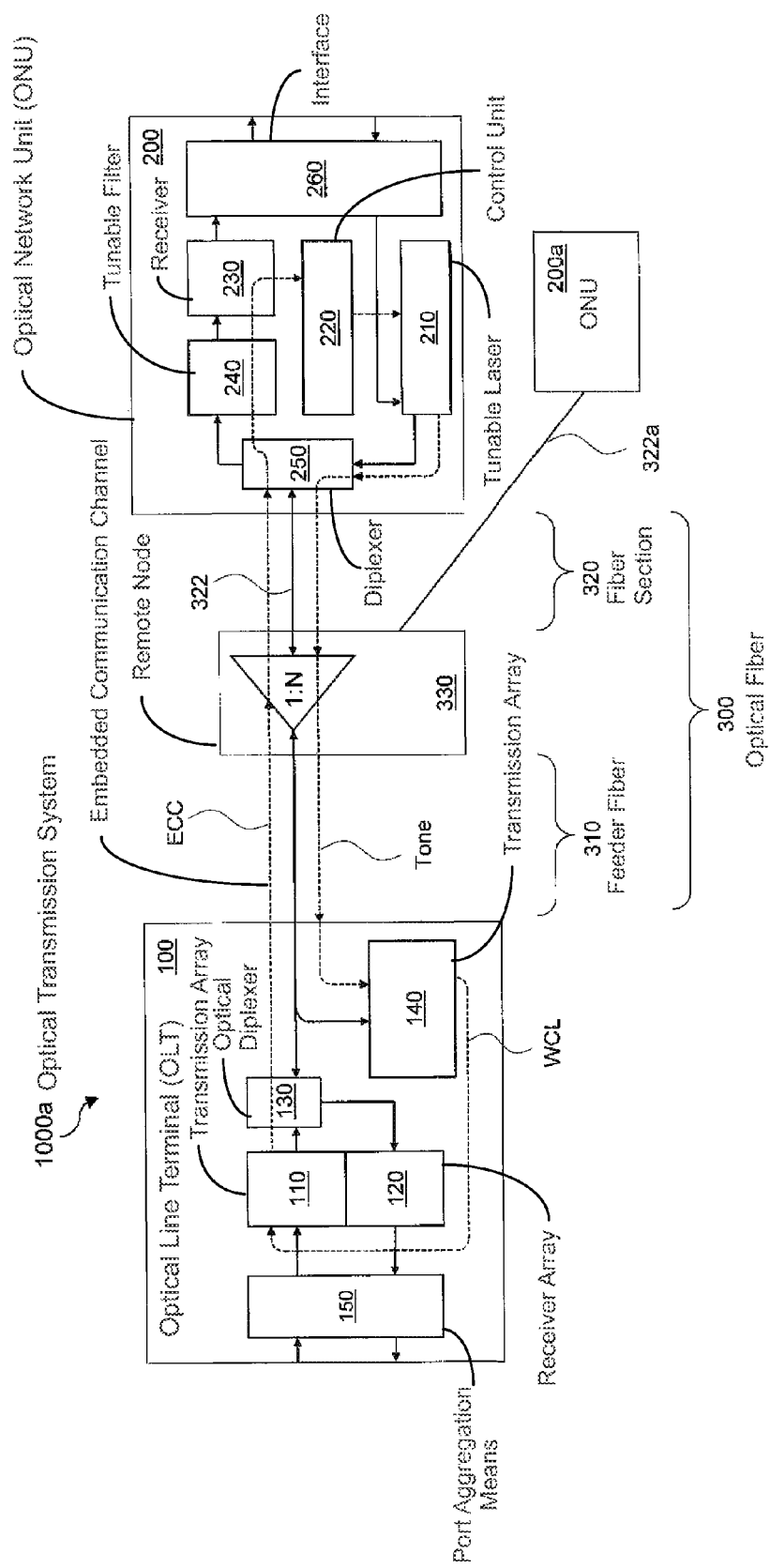
FIG. 4 depicts a schematic block diagram of an optical transmission system according to an embodiment.

Generally, the method according to FIG. 4, and step 400 in particular, may be invoked by the OLT 100 (FIG. 1) whenever it receives an upstream optical signal uos, us from an ONU 200, which indicates to the OLT 100 that a new ONU 200 wants to establish data communication with the OLT 100. Such upstream optical signal uos, in turn, may be transmitted from an ONU 200 whenever it is (re-)connected to the system 1000 or when it is powered on. The initial upstream optical signal uos from the ONU 200 may e.g. be transmitted on a commonly known wavelength or wavelength channel, e.g. in the wavelength range wr1, wherein the OLT 100 monitors this commonly known wavelength or wavelength channel to identify requests of new ONUs 200 for joining the system 1000.

After step 400 (FIG. 5), the OLT 100 assigns in step 410 a specific target wavelength $\lambda t$, that lies within said currently unused wavelength subrange wsr2, to said ONU 200. According to a particularly preferred embodiment, the step of assigning 410 said target wavelength $\lambda t$ within said currently unused wavelength subrange wsr2 to said ONU 200 comprises assigning the highest or lowest currently unused wavelength within said currently unused wavelength subrange wsr2 as said specific target wavelength $\lambda t$. This advantageously ensures an efficient usage of the currently unused wavelength subrange wsr2 and minimizes wavelength fragmentation thus avoiding the creation of a plurality of comparatively small unused wavelength subranges (not shown). The embodiment rather enables to maintain a comparatively large contiguous wavelength subrange of (still) unused wavelength channels, which is very advantageous since efficient wavelength tuning according to the inventive principle, that is explained in detail below, without disturbing other ONU's upstream communications is enabled for further ONUs.

Presently, in step 410, the OLT 100 assigns to the ONU 200 as a target wavelength $\lambda t$ for future upstream transmissions from the ONU 200 to the OLT 100 the highest free wavelength $\lambda t$, which represents a neighboring wavelength channel for the already assigned wavelength (channel) $\lambda 10$.

In step 420 (FIG. 5), the assigned target wavelength $\lambda t$ is signaled to the ONU 200, cf. the arrow s_$\lambda t$ of FIG. 1. According to an embodiment, the OLT 100 signals said target wavelength $\lambda t$ to said ONU 200 by using a common ("broadcast") downstream signaling channel or an already configured ONU-specific DL signaling channel on an own wavelength or the like.

According to an embodiment, the downstream signaling of the assigned target wavelength $\lambda t$ to the ONU 200 may also be performed on a predetermined, e.g. the lowest, wavelength channel within said L-band, i.e. at a wavelength of about 1565 nm, cf. the arrow ds of FIG. 2, thus keeping the remaining L-band wavelength channels available for further downlink transmissions, such as e.g. specific signaling or data purposes to single ONUs.

Alternatively or in addition to the lowest wavelength channel within said L-band, the highest wavelength channel within said L-band may also be used. As a further alternative, any other wavelength channel within the wavelength range wr2 used for downstream transmission may also be used for the above described downstream signaling, especially the downstream signaling of the assigned target wavelength $\lambda t$ to the ONU 200. Of course, if another wavelength range is used for downstream transmission, i.e. instead of the optical L-band, one or more suitable wavelength channels of such other wavelength range may be used for downstream signaling. Preferably, a common configuration information is provided to both OLT 100 and ONUs 200 operated in the same optical transmission system 1000, i.e. PON, which inter alia defines the specific wavelength channel(s) determined to be used for downstream signaling from the OLT 100 to the ONU(s) 200.

After the ONU 200 has received the assigned target wavelength $\lambda t$ from the OLT 100, or the corresponding signaling s_$\lambda t$, respectively, it may initiate one or more upstream signal transmissions at a preset wavelength identical to or derived from the assigned target wavelength $\lambda t$. Further details related to the wavelength setting by the ONU 200 at this stage are given below. The ONU's upstream signal transmissions are depicted by the arrow us in FIG. 1.

According to an embodiment, the OLT 100 receives the upstream signal us from the ONU, cf. step 430 of FIG. 5, and subsequently, in step 440, the OLT provides feedback information to said ONU 200. The feedback information comprises information on at least one of: (a) an actual wavelength and/or wavelength channel of said upstream signal us from said ONU 200, (b) an indication whether said actual wavelength of said upstream signal us is within a predetermined wavelength range with respect to the target wavelength $\lambda t$.

The provisioning of said feedback information may also be accomplished by signaling over the abovementioned downstream signaling mechanisms (i.e., common downstream signaling channel, ONU-individual downstream signaling channel, or the like).

After receiving the feedback information, the ONU 200 may advantageously alter its transmission wavelength or output wavelength to more precisely tune to the target wavelength $\lambda t$ (FIG. 3a) employing the feedback mechanism offered by the OLT 100. This way, the OLT 100 according to the embodiments efficiently supports the ONU 200 to attain its assigned target wavelength $\lambda t$ for upstream optical transmissions us to the OLT 100.

According to a further preferred embodiment, the OLT 100, preferably periodically, transmits downstream signaling ds to one or more ONUs 200, in at least one predetermined wavelength channel $\lambda 3$ within said second wavelength range wr2, wherein said at least one predetermined wavelength channel $\lambda 3$ preferably corresponds with an edge of said second wavelength range wr2. Thereby, an efficient downstream signaling to the ONU(s) 200 is ensured while at the same time avoiding fragmentation of the wavelength range wr2 used for downstream transmissions from the OLT 100.

Alternatively to the configuration depicted by FIG. 2, the downstream signaling could also be performed on a wavelength (channel) adjacent to or identical with the upper edge $\lambda 4$ of the second wavelength range wr2.

Periodical transmission of downstream signaling, in contrast to continuous transmission, advantageously helps to save energy. The downstream signaling provided by the OLT 100 according to an embodiment may e.g. comprise a pilot tone which may be inserted in a conventional manner by analog or digital modulation of an optical carrier signal associated with the specific wavelength channel(s) determined to be used for downstream signaling ds. According to a particularly preferred embodiment, the pilot tone comprises a predetermined, dedicated pilot tone frequency also known by the ONU(s) 200, which enables the ONU(s) 200 to efficiently identify the pilot tone sent by the OLT 100 in the course of downstream signaling.

According to a further preferred embodiment, the OLT 100 determines an actual wavelength and/or wavelength channel of said upstream signal us from said ONU 200, which enables to provide precise feedback (step 440 of FIG. 5) as to the actual wavelength emitted by the ONU 200 and thus contributes to the wavelength tuning of the ONU 200.

According to a further preferred embodiment, the OLT 100 signals to the ONU 200 that said target wavelength $\lambda t$ has been reached and/or that a difference between said target wavelength $\lambda t$ and an actual wavelength of said upstream signal us from said ONU 200 is below a predetermined threshold, so that the ONU 200 can instantly stop the wavelength tuning process once its actual output wavelength is sufficiently close to the target wavelength $\lambda t$ as assigned by the OLT 100. Again, the aforementioned signaling may be performed on a general downstream signaling wavelength that may be monitored by several ONUs or an ONU-specific wavelength monitored by the ONU 200.

According to a further preferred embodiment, the OLT 100 signals a downstream target wavelength to the ONU 200 which is to be used for future downstream communications from said OLT 100 to said ONU 200. Thereby, an overburdening of a common downstream signaling channel can be avoided.

According to a further preferred embodiment, the OLT 100 (FIG. 1) signals to one or more ONUs 200 to enter a delayed tuning mode, in which a specific ONU 200 delays its next upstream communication us to the OLT 200 on a random and/or pseudo-random basis. This is particularly useful if more than one ONU 200 is trying to initiate upstream communications us on a (potentially) commonly used upstream wavelength simultaneously. For example, each ONU 200 of the optical transmission system 1000 may be configured to use a commonly known wavelength for initial upstream communications to the OLT 100, which is monitoring said commonly known wavelength in order to detect new ONUs 200. If two or more ONUs 200 start upstream data transmissions, i.e. for the purpose of initializing a communications process with the OLT 100, simultaneously or at least in an overlapping manner, most probably, the individual data transmissions of the ONUs 200 will be at least partly corrupted, which can be recognized by the OLT 100 from the received signal, which is an aggregation of the colliding upstream signals and thus deviates from a regular initial upstream signal of a single ONU 200. In this case, the OLT 100 may issue a "delayed tuning mode" command to the ONUs 200, i.e. on the common downlink signaling channel ds (FIG. 2). Upon receiving said "delayed tuning mode" command, each ONU 200 enters the delayed tuning mode which provides that the ONU 200 determines a time delay on a random and/or pseudo-random basis, wherein said time delay defines how long the individual ONU 200 has to wait before it may start a next upstream data transmission to the OLT 100 on the commonly used upstream wavelength. The delay calculation may also involve evaluating an identifier of the ONU 200 and the like to further de-correlate the calculated delay times. This way, the probability that the next initial upstream data transmissions us of several ONUs 200 to the OLT 100 will overlap, is significantly reduced, which facilitates efficient initialization of communications with the OLT 100 for the involved ONUs 200. However, if a further collision of several ONU's upstream transmissions is detected, one or more further "delayed tuning mode" command may be issued by the OLT 100 until a corresponding ONU queue is empty.

According to a further embodiment, the ONUs 200 can restore their last settings (previously assigned upstream wavelength and/or previously assigned downstream wavelength and/or any associated pilot tones and/or pilot tone frequencies) within reasonable limits (time, temp. drift, etc.). This allows short-time black-out, and also doze/sleep modes of both, OLT 100 and ONUs 200, without requiring a new wavelength tuning process. The respective ONU 200 may simply restore its last settings (previously assigned upstream wavelength and/or previously assigned downstream wavelength and/or any associated pilot tones and/or pilot tone frequencies) and resume communications with the OLT 100.

According to a further preferred embodiment, the OLT 100 performs a process of wavelength defragmentation, which comprises re-assigning individual wavelengths to respective ONU(s) with the aim of creating or increasing the size of at least one wavelength subrange wsr2 (FIG. 3a) that comprises a plurality of contiguous unassigned wavelengths. The process of wavelength defragmentation may be performed both for upstream and/or downstream wavelength ranges wr1, wr2 (FIG. 2) or subranges wsr1, wsr2 (FIG. 3a) thereof and advantageously enables to maintain wavelength subranges with a plurality of contiguous unassigned wavelengths. This is particularly useful in combination with the inventive aspect of wavelength tuning of ONUs 200, where it is beneficial if at least one wavelength range used for upstream transmissions, i.e. from ONUs 200 to the OLT 100, comprises unused wavelength subranges that may serve as "tuning range" for an ONU 200 that is currently tuning in. I.e., the process of wavelength defragmentation enables to create or maintain free wavelength subranges wsr2 (FIG. 3a) that may advantageously be used for the inventive aspect of tuning the ONU's upstream signal wavelengths, which avoids interference between a ONU 200 currently tuning in and ongoing upstream transmissions of further ONUs.

Although the wavelength defragmentation is particularly beneficial for upstream wavelength ranges wr1 because it facilitates ONU tuning, it may also be applied to downstream wavelength ranges wr2 to simplify wavelength management at the OLT 100. Wavelength fragmentation may e.g. occur if individual upstream and/or downstream wavelengths are not used any more, for example if individual ONUs 200 are deactivated.

According to an embodiment, the defragmentation process may be initiated by the OLT 100 (FIG. 1) periodically, i.e. after a predetermined time of e.g. 1 minute, 10 minutes or the like. To reduce signaling overhead and the like, preferably, larger delays of about 1 hour or the like are also contemplated before a new defragmentation process is started by the OLT 100.

According to a further embodiment, the defragmentation process may also be initiated by the OLT 100 if a predetermined quality measure which characterizes the degree of fragmentation of at least one wavelength range wr1, wr2 exceeds a predetermined threshold. Such quality measure may e.g. reflect the number of contiguous free wavelengths/wavelength channels in the respective wavelength range wr1, wr2, and the like. Initiating defragmentation depending on a combination of several criteria such as a predetermined time delay and a degree of fragmentation is also possible.

According to a further embodiment, a wavelength defragmentation process may also be initiated by an OLT 100 upon receiving a signaling from an ONU 200 which notifies the OLT 100 that the respective ONU 200 will soon be deactivated. Such signaling may also be referred to as "dying gasp", because it is one of the last signals or the last signal sent from the respective ONU 200 to the OLT 100.

According to a further embodiment, the OLT 100 may also indicate status information related to a planned and/or an ongoing wavelength defragmentation process, preferably on a common downstream wavelength channel ds, so that ONUs 200 may get aware of the actual defragmentation status of the OLT 100. Upon evaluating this status information related to defragmentation provided by the OLT 100, a specific ONU 200 may decide to initiate upstream communications us with the OLT 100 instantly or to wait, e.g. for the end of a planned or ongoing defragmentation process, which may also be signaled by the OLT 100 to the ONU(s) 200.

A further aspect of the present invention is represented by a primary optical node, particularly an optical line terminal, OLT 100, an operation of which has already been explained above.

Yet another aspect of the present invention is represented by a method of operating a secondary optical node 200, particularly an ONU, and by a corresponding ONU 200.

Figure 7:
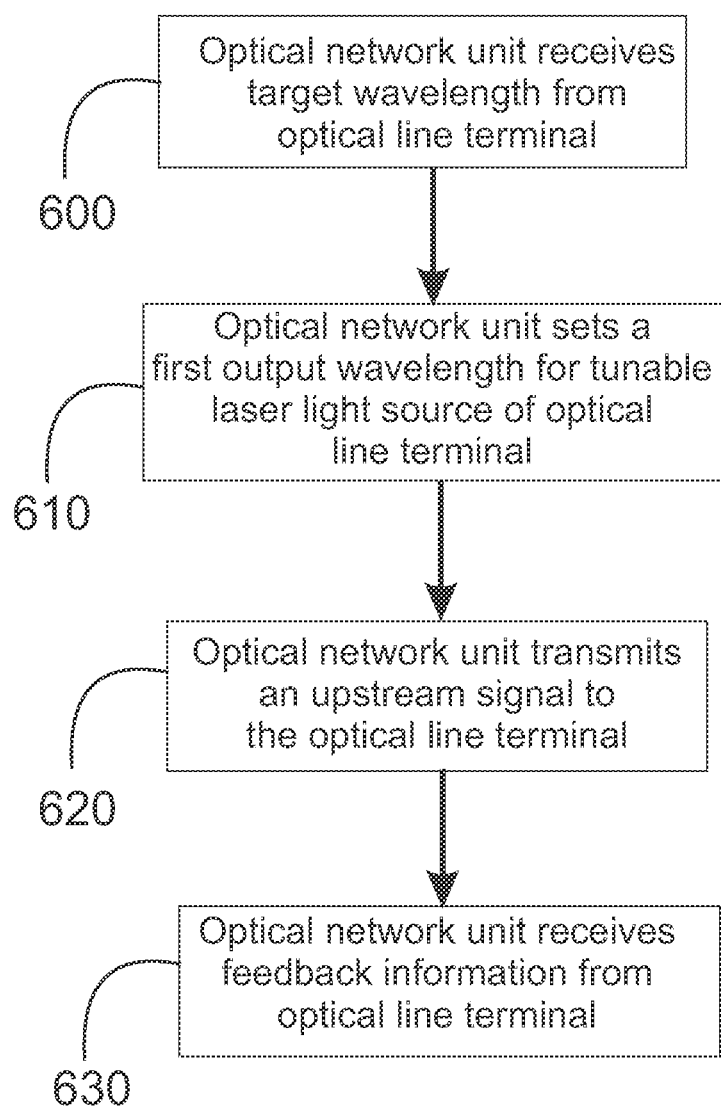
FIG. 7 depicts a simplified flow chart of a method of operating a secondary optical node according to an embodiment.

According to a preferred embodiment, said ONU 200 is configured to perform a method as depicted by the flowchart of FIG. 7. In a first step 600, the ONU 200 (FIG. 1) receives from said OLT 100 a target wavelength λt which is to be used by the ONU 200 for future upstream communications us with the OLT 100. After that, in step 610, the ONU 200 sets a first output wavelength of a tunable laser light source of the ONU 200, preferably depending on said target wavelength λt. Due to a limited precision of said setting process and the tunable laser light source of the ONU 200, the actual output wavelength of the tunable laser light source will differ from the target wavelength λt to some extent.

In step 620, the ONU 200 transmits an upstream signal us to said OLT 100 using said previously set (step 610) first output wavelength, and in step 630, the ONU 200 receives feedback information from said OLT 100, e.g. via a common or ONU-specific downstream signaling channel. The feedback information comprises information on at least one of: (a) an actual wavelength and/or wavelength channel of said upstream signal us, (b) an indication whether said actual wavelength of said upstream optical signal us is within a predetermined wavelength range with respect to the target wavelength λt.

According to a preferred embodiment, said ONU 200 tunes, i.e. alters, said first output wavelength of its tunable laser light source depending on said feedback information received from the OLT 100. Thus, the ONU 200 advantageously makes use of the feedback information provided by said OLT 100. Tuning in the sense of the present embodiment may comprise increasing or decreasing the output wavelength of the ONU's laser light source, either by a minimum possible amount which is usually defined by the system's precision regarding the setting of e.g. electric currents provided as tuning signal to the laser light source, or by increasing or decreasing the wavelength by larger amounts, i.e. in steps of predetermined wavelength difference.

According to an embodiment, the OLT's feedback information may also comprise information on a difference between the actual wavelength output by the ONU's laser light source and the target wavelength λt (FIG. 3a), or information that enables the ONU 200 to determine the difference between the actual wavelength output by the ONU's laser light source and the target wavelength λt. In this case, the ONU 200 may also take into consideration said wavelength difference for further tuning its output wavelength.

According to a further embodiment, the ONU 200 sets said first output wavelength of its tunable laser light source to a predetermined initial output wavelength, wherein a difference between said target wavelength and said predetermined initial output wavelength is greater or equal than a first threshold value. According to an embodiment, the threshold— which may be commonly known throughout the system, i.e. by OLT 100 and ONUs 200, or which may be signaled by the OLT 100 by downstream signaling ds—is chosen such that— under consideration of a potentially low precision regarding the setting of its wavelength—the first output wavelength of the ONU 200, which is initially set by the ONU 200, is sufficiently different from the target wavelength λt. This ensures, especially in cases where the target wavelength λt is close to already used wavelengths of other ONUs, that the currently considered ONU 200 can tune in, i.e. iteratively alter its wavelength, starting from the predetermined initial output wavelength, to the target wavelength λt, without erroneously setting its wavelength to a range that is already used thus causing interference with other ONUs.

Figure 3B:
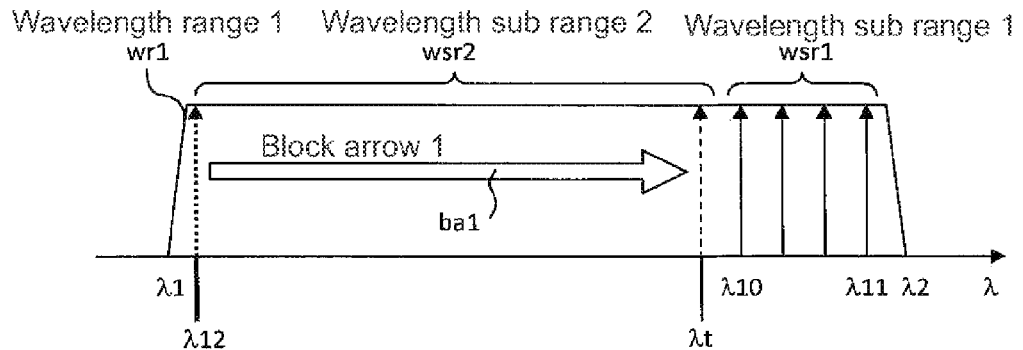
FIG. 3b schematically depicts details of a wavelength range used for upstream communications in an optical transmission system according to a further embodiment.

According to a further advantageous embodiment, said ONU 200 sweeps its output wavelength starting from said initial output wavelength in direction of said target wavelength λt. FIG. 3b depicts a wavelength range wr1 used for upstream transmissions us (FIG. 1) in the system 1000. Basically, the wavelength range wr1 of FIG. 3b is identical to the wavelength range wr1 of FIG. 3a. However, FIG. 3b additionally depicts the initial output wavelength λ12 used by the ONU 200 according to the above mentioned embodiment. Presently, according to FIG. 3b, the initial output wavelength λ12 is chosen to be adjacent to or identical with a lower edge of the wavelength range wr1 thus ensuring that there is a sufficient wavelength difference to the already used wavelengths of the subrange wsr1. I.e., even if the ONU 200 does not precisely set its output wavelength to the initial output wavelength λ12 due to low precision, the risk of interfering with currently operating wavelength channels in the subrange wsr1 is very low.

Starting from the initial output wavelength λ12, the ONU 200 sweeps, by increasing in the present situation, its output wavelength in the direction of the target wavelength λt, cf. the block arrow ba1. Since this sweeping only crosses the unused wavelength subrange wsr2 according to the embodiments, the used wavelength channels of subrange wsr1 remain undisturbed by the sweeping operation of the ONU 200.

During the sweeping process, which may comprise a plurality of upstream transmissions us (FIG. 1) to the OLT 100 as already explained above, said upstream transmissions being conducted with an increasing output wavelength in the sense of the sweep, the ONU 200 may receive the above explained feedback information from the OLT 100 which comprises information on an actual output wavelength of the ONU's signal us or a difference between said actual output wavelength and the target wavelength λt. Under evaluation of the OLT's feedback signaling, the ONU 200 continues its output wavelength sweep ba1, until the OLT 100 signals that the actual output wavelength is sufficiently close or identical to the target wavelength λt. In this case, the ONU 200 stops the sweeping operation in order not to interfere with the neighboring wavelength channel at wavelength λ10.

As already explained, in the course of sweeping, a presently unused wavelength subrange wsr2 as determined by the OLT 100 in the course of assigning 410 (FIG. 5) the target wavelength λt (FIG. 3b) (preferably at an edge of a currently unused wavelength subrange), cf. the embodiments disclosed above, is advantageously employed for wavelength tuning of the ONU's laser light source. Thus, a comparatively simple and low-cost laser light source may be used at the ONU 200 keeping system costs and complexity low. The reduced wavelength setting precision of the ONU's laser light source is fully compensated by the OLT 100 supporting the sweeping process via the feedback signaling.

Figure 3C:
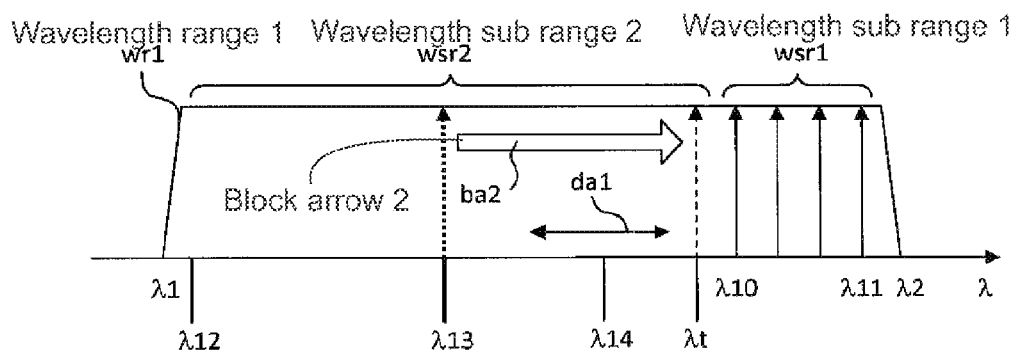
FIG. 3c schematically depicts details of a wavelength range used for upstream communications in an optical transmission system according to a further embodiment.

FIG. 3c shows another wavelength tuning scenario according to the embodiments. In this scenario, an initial output wavelength λ13 is chosen to be about in the middle of the free wavelength subrange wsr2, which reduces the sweeping distance ba2 until the output wavelength of the ONU 200 reaches the target wavelength λt. To avoid the risk of interfering with already operating upstream wavelength channels (subrange wsr1), however, the minimum wavelength distance of da1, which corresponds to a tuning precision of the ONU's laser light source, between the target wavelength λt and the initial output wavelength λ13 should be obeyed. I.e., in the present case, the initial output wavelength λ13 should be chosen such that λ13+da1<λt. In view of this, the initial output wavelength could e.g. be chosen at λ14, which even further reduces the sweeping distance until tuning is accomplished.

Figure 3D:
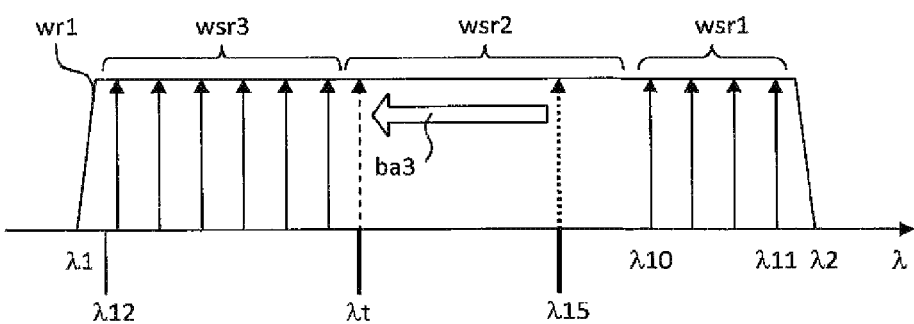
FIG. 3d schematically depicts details of a wavelength range used for upstream communications in an optical transmission system according to a further embodiment.

According to another preferred embodiment, wavelength tuning, by means of sweeping, may be performed in either direction, i.e. to higher wavelengths or to lower wavelengths with respect to the predetermined initial output wavelength λ15, cf. FIG. 3d, where the sweeping ba3 is performed in direction of lower wavelengths in the free subrange wsr2, which lies between already used wavelength subranges wsr1, wsr3. The sweeping direction depends on the target wavelength λt as assigned and signaled to the ONU 200 by the OLT 100 and on the predetermined initial output wavelength, which may also be signaled by the OLT 100 or which may be commonly known in the system, i.e. by configuration prior to deployment.

According to a further embodiment, it is possible that the sweep direction (up/down) and/or the initial output wavelength, which shall be used by the ONU 200 for the upstream wavelength tuning, are signaled from the OLT 100 in the course of downstream signaling. E.g., the OLT 100 may, preferably periodically, indicate via downstream signaling a) whether a next ONU joining the system 1000 should perform sweeping upwards or downwards, and b) the associated initial output wavelength for said sweeping.

Moreover, according to a further embodiment, the OLT 100 could signal to the ONUs a "sweep up"/"sweep down"—as well as the associated initial output wavelength—in an alternating fashion, or depending on a fragmentation status of the wavelength range wr1 (FIG. 2) to be populated with new ONUs' upstream transmissions.

According to an embodiment, the tuning process of the ONU's output wavelength for upstream communications to the OLT 100 is terminated as soon as the current output wavelength is sufficiently close (i.e., within a predetermined second threshold) to the target wavelength λt. After this tuning process, which may be considered a primary or "coarse" tuning process, the ONU 200 may optionally perform, preferably continuously, a secondary or "fine" tuning process, which is advantageously also assisted by the OLT 100 in the sense of provisioning of feedback regarding an actual output wavelength of the ONU's laser light source.

According to a further preferred embodiment, the ONU 200 sets said initial output wavelength to a wavelength value that is outside said first wavelength range wr1, i.e. smaller than λ1 in FIG. 3b. Thus it is guaranteed, that no further ONUs and their corresponding upstream transmissions in said first wavelength range wr1—if any—are disturbed. In some configurations, the OLT 100 may comprise an AWG (arrayed waveguide grating) filter in its receiver array, which is configured to cut off wavelengths exceeding the considered operating wavelength range wr1. Thus, the initial ONU wavelength according to this embodiment cannot even be received by the OLT's receivers.

According to an embodiment, the OLT 100 (FIG. 1) advantageously comprises tapping means which tap an upstream signal us arriving at an optical input port of the OLT 100, and wavelength analyzing means which are configured to determine a wavelength of a received upstream signal, such as e.g. the upstream signal us, uos as provided by an ONU 200 according to the embodiments in the course of wavelength tuning, so that the OLT 100 can determine an actual wavelength of the ONU 200 and may provide corresponding feedback to the ONU 200.

In configurations where the optical C-band is used as the first wavelength range wr1 (FIG. 2), the initial output wavelength used by an ONU 200 may e.g. be set to a value of about 1520 nm to 1525 nm, thus—even under influence of poor wavelength setting capability of the ONU's laser light source—being sufficiently far away from potentially used, i.e. occupied upstream wavelengths. Obviously, setting said initial output wavelength to a wavelength value that is outside said first wavelength range wr1 includes setting the value to be above or below the considered first wavelength range wr1 or its limits λ1, λ2, respectively, which may depend on the usage/availability of adjacent wavelength ranges such as the optical L-band, for example. E.g., in the configuration of FIG. 2, it would be preferable to set the initial output wavelength used by an ONU 200 to a value lower than λ1, because setting the initial output wavelength to a value higher than λ2 would interfere with the L-bands also configured for use according to this embodiment.

According to a further preferred embodiment, said ONU 200 (FIG. 1) notifies the OLT 100 that it will soon be deactivated and/or is being deactivated, which enables the OLT 100 to improve its wavelength management. For example, by receiving such signaling from one or more ONUs 200, the OLT 100 can derive whether a process of wavelength defragmentation is to be initiated.

According to a further preferred embodiment, said ONU 200 tunes, i.e. alters, said first output wavelength of its tunable laser light source 210 depending on said feedback information received 630 from the OLT 100. Tuning in the sense of the present embodiment may comprise increasing or decreasing the output wavelength of the ONU's laser light source, either by a minimum possible amount which is usually defined by the system's precision regarding the setting of e.g. electric currents provided as tuning signal to the laser light source, or by increasing or decreasing the wavelength by larger amounts, i.e. in steps of predetermined wavelength difference. The increments/decrements for tuning the wavelength may also be chosen by the ONU 200 depending on said feedback information received from the OLT, a number of tuning iterations that have already been performed, and so on.

According to a further preferred embodiment, the ONU 200 tunes tunable optical filter means of an optical receive path of said ONU 200 to a wavelength and/or wavelength channel used by the OLT 100 for downstream transmissions, wherein said step of tuning said tunable optical filter means is preferably performed prior to said step of receiving 600 (FIG. 7) from said OLT a target wavelength. Thus, advantageously, an ONU-specific downstream signaling channel between OLT 100 and ONU 200 may be established which may be used for further signaling purposes, i.e. in the course of output wavelength tuning of said ONU 200. Since the OLT's wavelength setting capabilities may be superior—regarding wavelength precision—compared to the ONU's filter tuning capabilities, thereby, implicitly, the ONU's tunable filter is "calibrated" to the downstream wavelength used by said OLT. I.e., with this embodiment, the ONU is not required to have a tunable optical filter with a high degree of absolute wavelength calibration or the like. It may rather tune in to the OLT's wavelength, e.g. by a sweeping process, wherein a center wavelength of the tunable filter of the ONU is continuously or by predetermined steps altered to finally "find" the downstream wavelength used by the OLT for downstream transmissions to said ONU. The specific downstream wavelength may also be signaled from the OLT to the ONU on a general downstream signaling channel or the like, and preferably after receiving the information on the specific downstream wavelength via said general downstream signaling channel, the ONU may start tuning its optical filter.

According to a further preferred embodiment, the ONU 200 first tunes its tunable filter to a specific downstream target wavelength, which may e.g. be signaled by the OLT 100 on a common downstream signaling, and/or which may be provided by the OLT with a specific pilot tone the ONU may recognize during the tuning process of its tunable filter, thus being enabled to easily detect the specific downstream target wavelength in the course of filter tuning. After said procedure of filter tuning, the further procedure of output wavelength tuning of said ONU may be performed. This advantageously ensures an efficient tuning of both the tunable optical receive filter of the ONU and of the output wavelength of the ONU while minimizing an impact of both tuning procedures on other devices, i.e. further ONUs.

FIG. 4 depicts a schematic block diagram of an optical transmission system 1000a according to a further embodiment. The system 1000a is configured as WDM PON comprising an OLT 100 and a first ONU 200. Further ONUs that may also be connected to the OLT 100 are symbolized by the block 200a. The OLT 100 comprises a transmission array ("Tx array") 110 for generating downstream transmission signals dos (FIG. 1) to the several ONUs 200, 200a and a receiver array ("Rx array") 120 for receiving upstream transmission signals uos from the several ONUs 200, 200a. Both the Tx array 110 and the Rx array 120 are connected to port aggregation means 150 that represent an interface of the OLT 100 to external components. The OLT 100 further comprises optical diplexer means 130 which are configured to receive downstream transmission signals from the Tx array 110 and to feed said downstream transmission signals to the optical fiber 300. The optical diplexer means 130 are further configured to receive upstream transmission signals from the optical fiber 300 and to feed said upstream transmission signals to the Rx array 120. The OLT 100 also comprises a control unit 140 that controls an operation of the OLT 100, and also particularly the execution of the method according to the embodiments—as far as it is implemented in the OLT 100. For this purpose, the control unit 140 may inter alia comprise wavelength determining means to determine a wavelength of an upstream signal us (FIG. 1) as received at the OLT 100 from the ONU 200. Further, the control unit 140 comprises a calculating unit such as a microcontroller and/or a digital signal processor (DSP) or an ASIC (application specific integrated circuit) or an FPGA (field programmable gate array) or the like which are configured to perform at least some of the steps according to the embodiments.

An optical communications channel between the OLT 100 and the ONU 200 is established by an optical fiber 300. The ONU 200 comprises a tunable laser light source 210, e.g. a tunable laser diode, TLD, an output wavelength of which may be controlled in a per se known manner by providing one or more electrical control currents to respective input terminals (not shown) of the TLD 210. The control signals for controlling the TLD's output wavelength are provided by a control unit 220 of the ONU 200, which may, in analogy to the control unit 140 of the OLT 100, comprise a calculating unit such as a microcontroller and/or a DSP or an ASIC or an FPGA or the like which are configured to perform at least some of the steps according to the embodiments. The control signals are symbolized by a dashed arrow from block 220 to block 210 in FIG. 4.

The ONU 200 further comprises receiver means 230 for receiving optical downstream signals dos, ds sent by the OLT 100. At the input of the receiver means 230, tunable filter means 240 are provided which may be adjusted regarding their filter characteristic to improve reception of the optical downstream signals by the receiver means 230. The tunable filter means may e.g. be controlled by the control unit 220.

The ONU 200 further comprises optical diplexer means 250 which are configured to receive downstream transmission signals from the OLT 100 and the optical fiber 300 and to feed said downstream transmission signals to the tunable filter 240. The optical diplexer means 250 are further configured to receive upstream transmission signals from the TLD 210 and to feed said upstream transmission signals to the optical fiber 300 for transmission to the OLT 100.

The ONU 200 also comprises interface means 260 which implement a preferably electrical data interface between the ONU 200 and external devices (not shown). The optical fiber 300 comprises a feeder fiber section 310 between the OLT 100 and a remote node 330 and a distribution fiber section 320 between the remote node 330 and the ONU 200. A first branch of the distribution fiber section 320, which connects ONU 200 with the remote node 320, is denoted with the reference sign 322. A further branch of the distribution fiber section 320, which connects a further ONU 200a with the remote node 320, is denoted with the reference sign 322a. Further ONUs (not shown) may also be connected to the OLT 100 via the remote node 320.

The remote node 320 comprises a 1:N power splitter that distributes the downstream optical signals from the OLT 100 to the various ONUs 200, 200a and that combines the upstream optical signals uos, us (FIG. 1) from the various ONUs 200, 200a into the feeder fiber section 310 for transmission to the OLT 100. Obviously, on each branch 310, 320, 322, 322a of the optical fiber there is a bidirectional optical data transmission between the OLT 100 and the various ONUs 200, 200a.

FIG. 4 also depicts as a dashed line an "embedded communications channel" ECC that may be used for signaling information relevant to the wavelength tuning process according to the embodiments and that may physically be implemented by using corresponding wavelength channels with respective pilot tones thereon and/or in-band signaling.

Also depicted as a dashed line is a signal "Tone" which represents the ONU's upstream signaling for the purpose of wavelength tuning. Correspondingly, ECC and Tone together transmission system 1000a of FIG. 4 uses the optical C-band, i.e. in a wavelength range ranging from about 1530 nm to about 1565 nm for upstream transmissions, and the optical L-band ranging from about 1565 nm to about 1625 nm for downstream transmissions. Other configurations are also possible. Also, both CWDM (coarse WDM) and/or DWDM (dense WDM) may be used in combination with the present invention and particularly with the embodiment according to FIG. 4. However, the inventive principle is not limited to WDM PONs, but may also be used in optical point-to-point communications with a single primary node and a single secondary node.

The operation of the optical transmission system 1000a according to FIG. 4 is explained below with reference to the flow charts of FIG. 6a, 6b and the signaling diagram of FIG. 8.

Figure 6A:
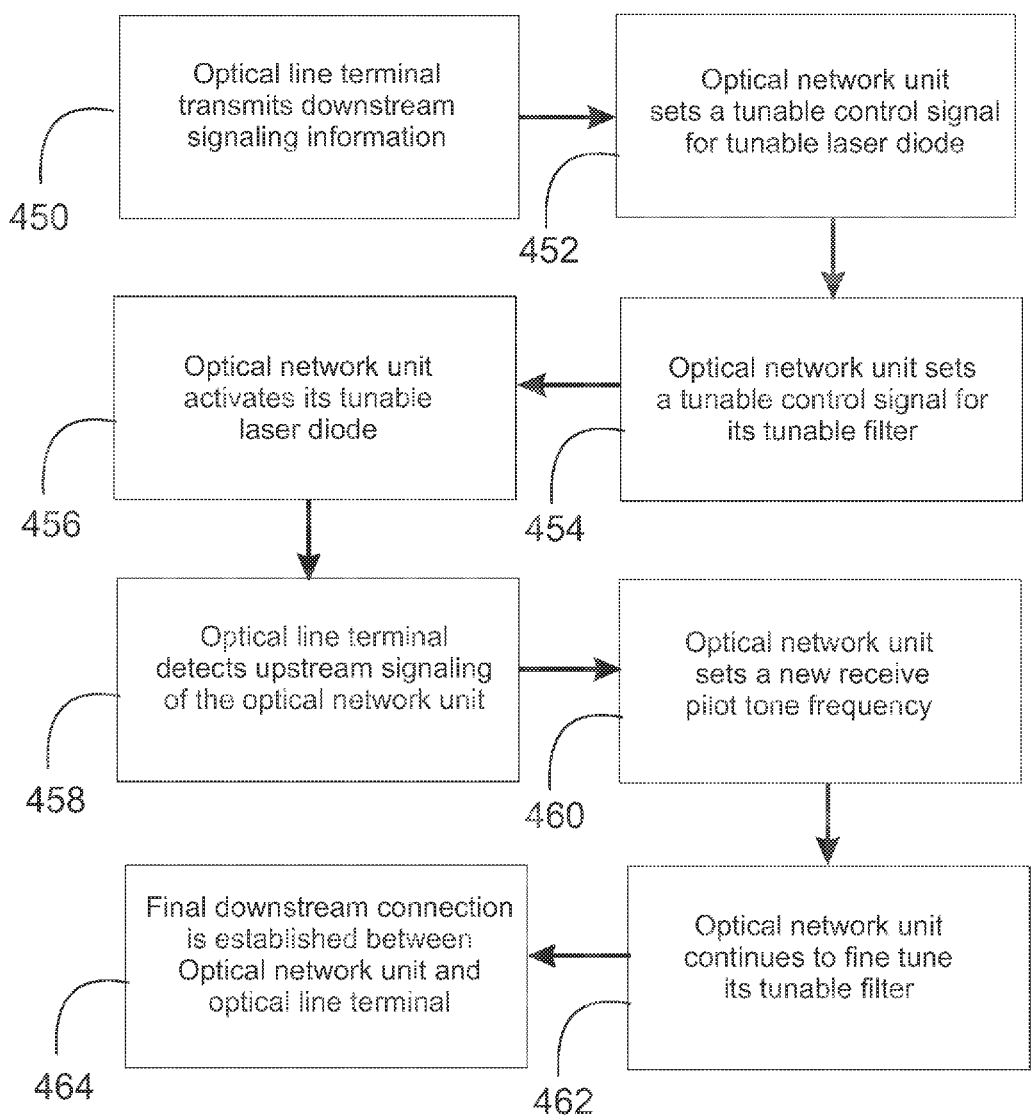
FIG. 6a, 6b depict a simplified flow chart of a method of operating an optical transmission system according to an embodiment.
Figure 6B:
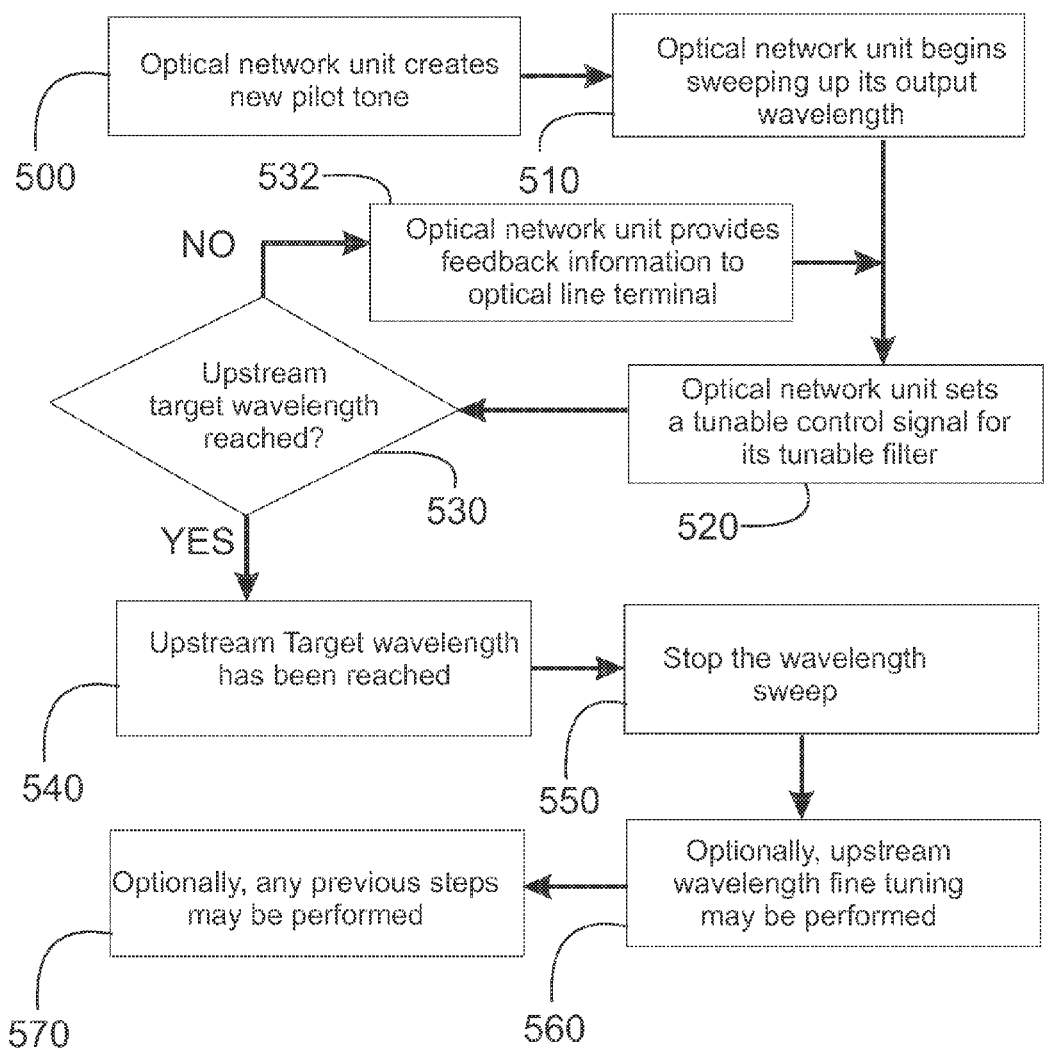

In step 450 of FIG. 6a, the OLT 100 (FIG. 4) transmits downstream signaling information, which may e.g. be done by generating a pilot tone (PT) having a specific frequency (PTF) in a specific wavelength (channel) designated for downstream signaling. Such specific wavelength (channel) may e.g. be the lowest wavelength channel of the L-band wr2 (FIG. 2) at about λ3, cf. the arrow ds which represents said downstream signaling. Preferably, all components 100, 200, 200a of the system 1000a are configured to be aware of this specific wavelength (channel) designated for downstream signaling.

Said transmission 450 of downstream signaling is preferably performed periodically, i.e. not continuously, to save energy at the OLT 100.

An ONU 200 that wishes to initiate communications with said OLT 100 over the optical fiber 300 (FIG. 4) sets a tuning control signal for its tunable laser diode TLD 210 so that an initial output wavelength is at the lowest possible value, preferably below the c-band wavelength range wr1 (FIG. 2), i.e. about 1520 nm to 1525 nm. This is performed in step 452 of FIG. 6a.

Also in step 452, the ONU 200 configures its receiver 230 to detect the pilot tone of specific frequency (PTF), which is periodically transmitted by the OLT 100 according to step 450.

After that, in step 454, the ONU 200 sets a tuning control signal for its tunable filter 240 (FIG. 4) so that the tunable filter 240 selects the lowest wavelength channel of the L-band, which is designated for downstream signaling from the OLT 100, cf. step 450 above, which enables the ONU 200 to find the downstream pilot tone of the OLT 100.

After step 454 is completed, a first downstream signaling connection between the OLT 100 and the ONU 200 is established, namely via the lowest L-band wavelength channel ds (FIG. 2).

According to a further embodiment, tuning of multiple ONUs 200, 200a can also be coordinated via a pilot tone by the OLT 100. For example, if two or more ONUs 200, 200a are trying to initiate a tune-in process with the OLT 100 simultaneously by corresponding upstream transmissions to the OLT 100 most probably, the individual data transmissions of the ONUs 200, 200a will be at least partly corrupted, which can be recognized by the OLT 100. In this case, the OLT may issue a "delayed tuning mode" command to the ONUs 200, 200a, i.e. on the common downlink signaling channel, according to the present embodiment the lowest wavelength channel of the L-band. Upon receiving said "delayed tuning mode" command, each ONU 200, 200a enters the delayed tuning mode which provides that the ONU determines a time delay on a random and/or pseudo-random basis, wherein said time delay defines how long the ONU has to wait before it may start a next upstream data transmission to the OLT on the commonly used upstream wavelength. This way, the probability that the next initial upstream data transmissions of several ONUs to the OLT will overlap, is significantly reduced, which facilitates efficient initialization of communications with the OLT for the involved ONUs.

In step 456, the ONU 200 activates its tunable laser diode 210 (with an initial output wavelength set below the Cband, cf. step 452). For this process, a nominal output power of the TLD 210 may be used since there is no danger to interfere with existing upstream transmission due to the special selection of the initial output wavelength outside the C-band. Also, the ONU 200 may apply a pilot tone to the transmission on the initial output wavelength. This upstream pilot tone sent by the ONU 200 may be identical in modulation and frequency with respect to the OLT's pilot tone in the downlink signaling, cf. step 450. However, it may also be different from the OLT's pilot tone. Preferably, if it is not identical to the OLT's pilot tone, the ONU's upstream pilot tone is commonly known by ONU 200 and OLT 100 so that the OLT 100 can efficiently discover it in the upstream signaling us of the ONU 200.

In step 458 of the flow-chart according to FIG. 6a, the OLT 100 detects the upstream signaling of the ONU 200 at the initial output wavelength below the C-band and/or the corresponding pilot tone provided by the ONU 200 in the upstream transmission us.

Detection of the upstream signaling of the ONU 200 at the OLT 100 is e.g. performed by tapping the fiber 300 to the control unit 140, so that the control unit 140 may analyze any upstream signaling received via the optical fiber 300, even if it is outside the nominal upstream transmission wavelength range (here for example: the optical C-band).

Upon detecting the upstream signaling of the ONU 200 at the OLT 100, the OLT 100 signals to the ONU 200 by means of downstream signaling an upstream target wavelength $\lambda t$ which the ONU 200 is supposed to use for future upstream transmissions us to the OLT 100. Likewise, the OLT 100 may signal to the ONU 200 by means of downstream signaling a downstream target wavelength which the OLT 100 will use in future for downstream transmissions ds (FIG. 2) to the ONU 200. These measures are also performed in step 458. Signaling of these two target wavelengths is still performed using the common specific wavelength (channel) ds designated for downstream signaling.

According to a preferred embodiment, for the upstream target wavelength $\lambda t$ which is signaled to the ONU 200 in step 458 the highest free C-band wavelength is chosen, cf. FIG. 3a. According to a preferred embodiment, for the downstream target wavelength which is signaled to the ONU 200 in step 458 the highest free L-band wavelength is chosen, i.e. $\lambda 4$ of FIG. 3a.

After that, the OLT 100 activates the downstream target wavelength as previously signaled to the ONU 200. I.e., for further downstream signaling to the ONU 200, the downstream target wavelength, presently e.g. the highest previously free L-band wavelength is chosen, and the common specific wavelength (channel) ds is not used any more for future downstream signaling to the ONU 200.

When activating the downstream target wavelength, the OLT 100 may assign a specific further pilot tone to this downstream target wavelength that is transmitted to the ONU 200 via said downstream target wavelength. Further, the OLT 100 may set a respective pilot tone frequency of the specific further pilot tone for an upstream receive wavelength, i.e. the target wavelength for future upstream transmissions of said ONU 200 to the OLT 100.

After that, in step 460, the ONU 200 sets the new receive pilot tone frequency, i.e. said specific further pilot tone associated with the downstream target wavelength, to be prepared to detect downstream transmissions from the OLT 100 with the specific further pilot tone on the downstream target wavelength.

Also in step 460, the ONU 200 sweeps its tunable filter 240 up to the target downstream wavelength, until it detects the specific further pilot tone on the downstream target wavelength. Thereby, an efficient tuning of the tunable filter 240 of the ONU 200 is enabled without requiring wavelength references within the ONU 200. A precise tuning of the ONU's tunable filter 240 is rather enabled by the support of the OLT 100 as explained for the preceding steps.

In step 462, the ONU 200 may continue to fine tune its tunable filter 240 based on criteria such as a maximum pilot tone amplitude detected in the downstream signaling and/or received signal power.

Block 464 indicates that a final downstream connection between the OLT 100 and the ONU 200 has been established. This may optionally be signaled, i.e. acknowledged, by the ONU 200 to the OLT 100 via upstream signaling.

After this, according to a further embodiment, a process of wavelength tuning of the ONU's output wavelength may be performed, cf. the reference numeral A of FIG. 6a. The procedure A of wavelength tuning according to this further embodiment is explained below with reference to FIG. 6b.

In a step 500, the ONU 200 may create a new pilot tone to be transmitted in further upstream transmissions us used for wavelength tuning. Preferably, the parameters of this new pilot tone are commonly known to OLT 100 and ONU 200; they may also have been signaled by the OLT 100 to the ONU prior to step 500.

In step 510, the ONU 200 starts sweeping up (i.e., in direction of increasing wavelength) its output wavelength, starting from the above mentioned initial output wavelength, cf. e.g. wavelength λ12 of FIG. 3b.

According to a further embodiment, for the process of setting the initial output wavelength and the process of sweeping, the ONU 200 may use coarse-calibration knowledge of its TLD 210 to shorten up-sweep. For example, the ONU 200 may directly jump to a wavelength λ13 (FIG. 3c) that is comparatively close to the target wavelength λt (at least, closer than the wavelength λ12 at the lower edge of the wavelength range wr1). However, the choice of the closer wavelength λ13 and its distance to the target wavelength λt should depend on coarse tuning knowledge, i.e. rough information about the wavelength setting precision of the TLD 210 in order not to interfere with the already used wavelengths in the subrange wsr1 (FIG. 3c) by accidentally "tuning" the TLD's output wavelength to a value within said subrange wsr1. For example, when using a CWDM scheme for upstream transmissions, when setting the initial output wavelength of the ONU 200, the ONU 200 may start its sweep as close as two wavelength channels away from the target wavelength λt, e.g. at λ14 of FIG. 3c, if "tuning", i.e. initial setting of the wavelength at the ONU 200 or its TLD 210 into ±2 channels is considered to be safe.

In step 520, the OLT 100 detects the ONU's upstream transmission during the sweep, and determines an actual upstream wavelength emitted by the ONU 200 or an actual wavelength channel corresponding with said actual upstream wavelength. This can be performed by employing the optical fiber tap between the fiber 300 and the control unit 140 and by analyzing the received actual upstream wavelength in said control unit 140 in a per se known manner. Advantageously, the comparatively costly wavelength determining means need only be provided in the (central) OLT 100, and not in the ONU(s) 200.

In step 530, the OLT 100, or its control unit 140, determines whether the upstream target wavelength, that has previously been signaled by the OLT 100 to the ONU 200 (cf. step 458 of FIG. 6a), has been reached (or if the received actual upstream wavelength is sufficiently close to it). If this is true, the procedure continues with step 540. If not, step 532 is entered, in which the OLT 100 provides feedback information to the ONU 200 which comprises information on at least one of: (a) an actual wavelength and/or wavelength channel of said upstream signal us from said ONU 200, (b) an indication whether said actual wavelength of said upstream optical signal (us) is within a predetermined wavelength range with respect to the target wavelength λt. After step 532, the procedure continues with step 520.

However, if the determination of step 530 indicates that the upstream target wavelength λt (FIG. 3b) has been reached (or if the received actual upstream wavelength is sufficiently close to it), the procedure continues with step 540.

In step 540, the OLT 100 signals to the ONU 200 that the upstream target wavelength λt has been reached and/or that the received actual upstream wavelength is sufficiently close to the upstream target wavelength λt. At this point, the ONU 200 knows that it has reached the proper upstream target wavelength λt, and in step 550 it stops the wavelength sweep.

According to a further embodiment, the OLT 100 can detect if the current upstream wavelength of the ONU 200 is too low and can signal to increment the upstream wavelength, wherein also the value of the increment may be proposed by the OLT 100 to the ONU 200.

Advantageously, the method according to the embodiments does not disturb other clients, i.e. ONUs 200a (FIG. 4), because the sweep ba2 (FIG. 3c) for upstream wavelength tuning is advantageously performed across currently unused wavelength channels or a currently unused wavelength range wsr2 associated therewith.

Optionally, in subsequent step 560, upstream wavelength fine tuning may be performed, which is not subject of the present invention.

After the optional wavelength fine tuning of step 560, a normal operation of the optical transmission system 1000a according to FIG. 4 may commence. I.e., at this stage, the OLT 100 and the ONU 200 have negotiated the wavelengths and/or wavelength channels to be used for upstream and downstream transmissions, and the ONU's laser light source 210 and its tunable filter 240 have been tuned by means of the feedback mechanism according to the embodiments, which has been assisted by the OLT 100, advantageously employing the rather sophisticated and precise (in comparison to the ONU 200) wavelength setting and wavelength determining capabilities.

According to further embodiments, any of the steps 450 to 570 explained above with reference to FIG. 6a, 6b may be combined with any step(s) of the embodiments according to FIG. 5, 7. Particularly, it is possible that one further embodiment encompasses only tuning of the ONU's output wavelength (but not its tunable filter 240 of the optical reception path), while another embodiment encompasses only tuning of the ONU's tunable filter 240 of the optical reception path (but not its output wavelength of the TLD 210), and the like. Also, the already above explained wavelength defragmenting process may be combined with the embodiments according to the flow charts of FIGS. 5 to 7.

Figure 8:
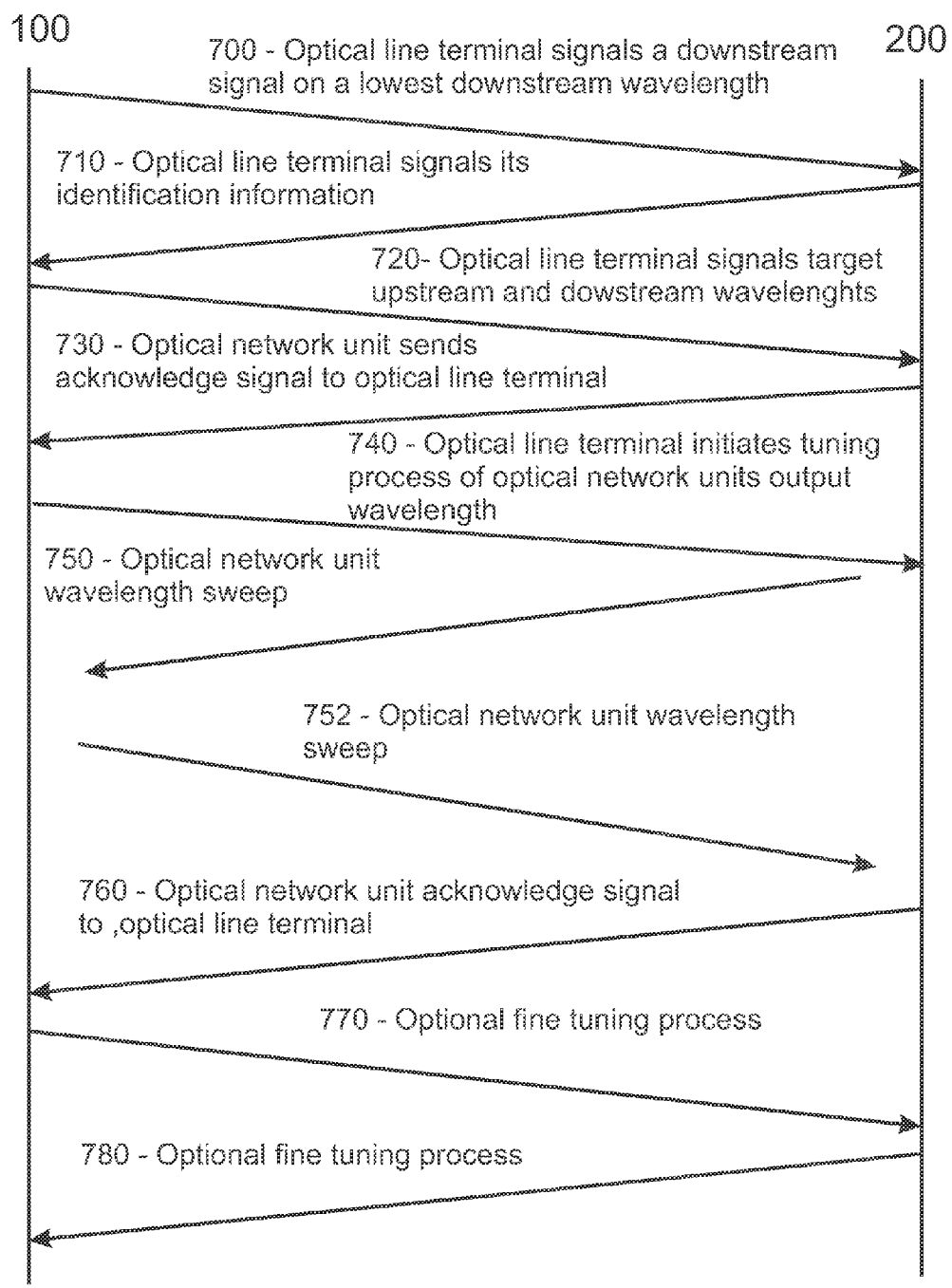
FIG. 8 depicts a simplified signaling diagram of a method of operating an optical transmission system according to an embodiment.

FIG. 8 depicts a signaling diagram according to a further embodiment. The OLT 100, preferably periodically, signals a downstream signal 700 on a lowest downstream wavelength ds (FIG. 2), preferably using a pilot tone with a frequency PTFTUNE. Upon receiving said downstream signal 700, the ONU 200 activates its TLD 210 (FIG. 4) on a lowest possible wavelength, e.g. directly below the C-band, signaling its identification information 710, preferably via a further pilot tone.

Upon receiving said identification information 710 of the ONU, the OLT detects and identifies the ONU 200, and the 30 OLT sets a downstream transmission wavelength specific to said ONU 200 and an associated pilot tone frequency to be used with said downstream transmission wavelength for the ONU 200. Then, the OLT 100 signals target upstream and downstream wavelengths by the downstream signal 720 to the ONU 200. Optionally, in the course of the downstream signal 720, the OLT 100 may also request an acknowledge for the downstream signal 720 from the ONU 200.

Upon receiving the downstream signal 720 from the OLT 100, the ONU 200 may set its tunable filter 240 to the downstream wavelength indicated by the OLT 100 in the downstream signal 720. Additionally, the ONU 200 may configure its receiver path to detect the associated pilot tone frequency to be used with said downstream transmission wavelength for the ONU 200. After this, the ONU 200 sends a corresponding acknowledge signal 730 to the OLT 100.

Upon receiving the acknowledge signal 730, the OLT 100 configures its receiver means, which may e.g. be comprised in the Rx array 120 (FIG. 4), to the negotiated upstream receive pilot tone frequency to be able to detect future upstream communications from the ONU 200.

With the subsequent signaling 740, the OLT 100 initiates the ONU's upstream wavelength tune-in, i.e. the tuning process of the ONU's output wavelength. At this stage, the OLT 100 may also request an acknowledgement to be sent by the ONU 200 once it has tuned to the target wavelength.

Upon receiving the signaling 740, the ONU 200 sets a, preferably unique, transmission pilot tone frequency and starts the wavelength sweep procedure with said pilot tone.

The signal arrows 750 and 752 symbolize the wavelength sweep process of the ONU 200, which may be iteratively performed as already explained above by employing feedback signaling from the OLT 100.

With the signal 752, the ONU 200 may explicitly request the OLT 100 to signal to the ONU 200 that the target wavelength has been reached. Once the actual output wavelength of the ONU 200 is sufficiently close to or identical with the target wavelength, the OLT 100 correspondingly signals this information to the ONU 200 thus requesting the ONU 200 to stop the sweep, which may be done by a "TUNE_STOP" signal 752.

Upon receiving said "TUNE_STOP" signal 752, the ONU 200 locks its TLD 210, i.e. the wavelength currently set, and sends an acknowledgement "ACK_TUNE" 760 to the OLT 100.

At this stage, the ONU's output wavelength used for upstream transmissions to the OLT 100 is tuned, and a further, optional, fine tuning process may be initiated, cf. the further signaling 770, 780.

After this fine tuning process, or directly after the acknowledgement "ACK_TUNE" 760, normal data transmission between the OLT 100 and the ONU 200 may be performed.

According to a further embodiment, a so-called "single-user deactivation", wherein a ONU's user deactivates his ONU 25 200, may occur. This may be the case when the user intentionally ("malicious user") or accidentally (e.g., over vacation) deactivates his ONU 200. Upon reactivating the ONU 200, it may initiate upstream transmissions to the OLT 100 on a commonly known wavelength reserved for this purpose aiming at performing a new wavelength tuning process. Alternatively, the ONU 200 may recall upon reactivation the previous wavelength tuning settings and may reuse them.

According to a further embodiment, a reactivated ONU 200 may monitor a common downstream signaling channel ds (FIG. 2) on which the OLT 100 may e.g. broadcast information whether it is ready to perform wavelength tuning with a new ONU 200 and/or whether (and/or when) a wavelength defragmentation is planned, and the like. Depending on this information, the ONU 200 decide on whether to directly initiate wavelength tuning with the OLT 100 or to wait and the like.

According to a further embodiment, to avoid potential problems related to deactivation of an individual ONU 200, it may also be provided that an ONU 200 stays always on, i.e. activated, which is especially tolerable if the ONU 200 comprises power-save modes (doze, sleep, shedding) which limit inactive-ONU power consumption to about <500 mW (Milliwatt).

According to a further embodiment, the downstream signaling from the OLT 100 to one or more ONUs 200, 200a may also be performed in an in-band fashion, e.g. by using layer-1 or layer-2 signaling functions. This may either be performed on a common downstream wavelength channel ds (FIG. 2) or on a dedicated downstream wavelength channel specifically assigned to an ONU 200. By using in-band signaling for the signaling processes according to the embodiments, advantageously, the use of pilot tones in the downstream may be avoided.

According to a further embodiment, instead of choosing an initial output wavelength λ12 (FIG. 3b) for starting the wavelength tuning, for example with a sweep ba1, at the lower edge of an available subrange wsr2, the initial output wavelength can also be set to an upper edge of an available subrange wsr2 (FIG. 3d), so as to populate available wavelengths from an upper end of the available subrange.

A combination of both directions of populating wavelengths in one or more available subranges of the usable wavelength range wr1 is also possible and offers the advantage of a reduced effort regarding a mean wavelength-shift. I.e., in the combined approach, the mean sweeping distance for a plurality of ONUs is reduced by applying both up-sweeping and down-sweeping. The sweep direction (up/down) may e.g. be chosen depending on a fragmentation status of the usable wavelength range wr1.

According to a further embodiment, it is possible that the sweep direction (up/down) and/or the initial output wavelength, which shall be used by the ONU 200 for the upstream wavelength tuning, are signaled from the OLT 100 in the course of downstream signaling. E.g., the OLT 100 may, preferably periodically, indicate via downstream signaling a) whether a next ONU 200a joining the system 1000, 1000a should perform sweeping upwards or downwards, and b) the associated initial output wavelength for said sweeping.

Moreover, according to a further embodiment, the OLT 100 could signal to the ONUs a "sweep up"/"sweep down"— as well as the associated initial output wavelength—in an alternating fashion, or depending on a fragmentation status of the wavelength range wr1 (FIG. 2) to be populated with new ONUs' upstream transmissions.

The invention claimed is:

1. A method of operating a primary optical node, particularly an optical line terminal, (OLT), for an optical communications system wherein said OLT is configured to receive at least one upstream optical signal from at least one secondary optical node, particularly optical networking unit (ONU) within at least a first wavelength range, and to transmit at least one downstream optical signal to said at least one ONU within at least a second wavelength range, wherein said OLT:
   determines a currently unused wavelength subrange within said first wavelength range identifying at least a highest and lowest currently unused wavelength in the subrange;
   assigns a specific target wavelength within said currently unused wavelength subrange to said ONU;
   signals said target wavelength to said ONU;
   receives an upstream signal from said ONU; and
   provides feedback information to said ONU which comprises information on an indication whether said actual wavelength of said upstream optical signal is within the subrange with respect to the target wavelength.

2. The method according to claim 1, wherein said OLT periodically, transmits downstream signaling to one or more ONUs, in at least one predetermined wavelength channel within said second wavelength range, wherein said at least one predetermined wavelength channel corresponds with an edge of said second wavelength range.

3. The method according to claim 1 wherein said OLT determines an actual wavelength and/or wavelength channel of said upstream signal from said ONU.

4. The method according to claim 1 wherein said OLT signals to the ONU that said target wavelength has been reached and/or that a difference between said target wavelength and an actual wavelength of said upstream signal from said ONU is below a predetermined threshold.

5. The method according to claim 1 wherein the step of assigning a specific target wavelength within said currently unused wavelength subrange to said ONU comprises assigning the highest or lowest currently unused wavelength within said currently unused wavelength subrange as said specific target wavelength.

6. The method according to claim 1 wherein the OLT signals a downstream target wavelength to the ONU which is to be used for future downstream communications from said OLT to said ONU.

7. The method according to claim 1 wherein the OLT signals to one or more ONUs to enter a delayed tuning mode, in which a specific ONU delays its next upstream communication to the OLT on a random and/or pseudo-random basis.

8. The method according to claim 1 wherein the OLT performs a process of wavelength defragmentation, which comprises re-assigning individual wavelengths to respective ONUs with the aim of creating or increasing the size of at least one wavelength subrange that comprises a plurality of contiguous unassigned wavelengths.

9. A primary optical node, particularly an optical line terminal (OLT), for an optical communications system, wherein said OLT is configured to receive at least one upstream optical signal from at least one secondary optical node, particularly optical networking unit, ONU, within at least a first wavelength range, and to transmit at least one downstream optical signal to said at least one ONU within at least a second wavelength range, wherein said OLT is configured to:
  determine a currently unused wavelength subrange within said first wavelength range identifying at least a highest and lowest currently unused wavelength in the subrange;
  assign a specific target wavelength within said currently unused wavelength subrange to said ONU;
  signal said target wavelength to said ONU;
  receive an upstream signal from said ONU; and to
  provide feedback information to said ONU which comprises information on an indication whether said actual wavelength of said upstream signal is within the subrange with respect to the target wavelength.

10. A method of operating a secondary optical node particularly an optical network unit (ONU), for an optical communications system, wherein said ONU is configured to transmit at least one upstream optical signal to at least one primary optical node, particularly optical line terminal (OLT), within at least a first wavelength range, and to receive at least one downstream optical signal from said OLT within at least a second wavelength range, wherein said ONU:
  receives from said OLT a target wavelength which is to be used by the ONU for future upstream communications with the OLT;
  sets a first output wavelength of a tunable laser light source of the ONU depending on said target wavelength;
  transmits said upstream optical signal to said OLT using said first output wavelength; and
  receives feedback information from said OLT which comprises information on an indication whether said actual wavelength of said upstream signal is within the subrange with respect to the target wavelength.

11. The method according to claim 10, wherein said ONU alters said first output wavelength of its tunable laser light source depending on said feedback information received from the OLT.

12. The method according to claim 10, wherein said ONU sets said first output wavelength of its tunable laser light source to a predetermined initial output wavelength, wherein a difference between said target wavelength and said predetermined initial output wavelength is greater or equal than a first threshold value.

13. The method according to claim 12, wherein said ONU sweeps its output wavelength starting from said initial output wavelength in direction of said target wavelength.

14. The method according to claim 10 wherein said ONU sets said first output wavelength and/or said initial output wavelength to a wavelength value that is outside said first wavelength range.

15. The method according to claim 10 wherein said ONU notifies the OLT that it will soon be deactivated and/or is being deactivated.

16. The method according to claim 10 wherein said ONU tunes a tunable optical filter means of an optical receive path of said ONU to a wavelength and/or wavelength channel used by the OLT for downstream transmissions, wherein said step of tuning said tunable optical filter means is performed prior to said step of receiving from said OLT a target wavelength.

17. A secondary optical node, particularly an optical network unit (ONU) for an optical communications system, wherein said ONU is configured to transmit at least one upstream optical signal to at least one primary optical node, particularly an optical line terminal (OLT), within at least a first wavelength range, and to receive at least one downstream optical signal from said OLT within at least a second wavelength range, wherein said ONU is configured to:
  receive from said OLT a target wavelength which is to be used by the ONU for future upstream communications with the OLT;
  set an first output wavelength of a tunable laser light source of the ONU, preferably depending on said target wavelength;
  transmit an upstream signal to said OLT using said first output wavelength; and to:
  receive feedback information from said OLT which comprises information on an indication whether said actual wavelength of said upstream signal is within a predetermined wavelength range with respect to the target wavelength.

18. An optical communications system comprising a primary node, particularly optical line terminal (OLT), and at least one secondary node, particularly an optical network unit, (ONU), wherein said OLT and said ONU are configured to exchange data via at least one optical communications channel comprising an optical fiber, wherein said OLT is configured to receive at least one upstream optical signal from said at least one ONU within at least a first wavelength range, and to transmit at least one downstream optical signal to said at least one ONU within at least a second wavelength range, wherein said OLT is configured to:
  determine a currently unused wavelength subrange within said first wavelength range, identifying at least a highest and lowest currently unused wavelength within the subrange;
  assign a specific target wavelength within said currently unused wavelength subrange to said ONU;
  signal said target wavelength to said ONU;
  receive an upstream signal from said ONU; and to
  provide feedback information to said ONU which comprises information on an indication whether said actual wavelength of said upstream signal is within the subrange with respect to the target wavelength, wherein said ONU is configured to:
  receive from said OLT said target wavelength which is to be used by the ONU for future upstream communications with the OLT;
  set a first output wavelength of a tunable laser light source of the ONU, preferably depending on said target wavelength;

transmit an upstream signal to said OLT using said first output wavelength; and to receive said feedback information from said OLT which comprises information on an indication whether said actual wavelength of said upstream signal is within a predetermined wavelength range with respect to the target wavelength.

19. A method of operating an optical communications system comprising a primary node, particularly an optical line terminal (OLT), and at least one secondary node, particularly an optical network unit (ONU), wherein said OLT and said ONU are configured to exchange data via at least one optical communications channel comprising an optical fiber, wherein said OLT is configured to receive at least one upstream optical signal from said at least one ONU within at least a first wavelength range, and to transmit at least one downstream optical signal to said at least one ONU within at least a second wavelength range, wherein said OLT:

determines a currently unused wavelength subrange within said first wavelength range identifying at least a highest and lowest currently unused wavelength within the subrange;

assigns a specific target wavelength within said currently unused wavelength subrange to said ONU;

signals said target wavelength to said ONU;

receives an upstream signal from said ONU; and provides feedback information to said ONU which comprises information on an indication whether said actual wavelength of said upstream signal is within the subrange with respect to the target wavelength; and wherein said ONU:

receives from said OLT said target wavelength which is to be used by the ONU for future upstream communications with the OLT;

sets a first output wavelength of a tunable laser light source of the ONU, preferably depending on said target wavelength;

transmits an upstream signal to said OLT using said first output wavelength; and receives said feedback information from said OLT which comprises information on an indication whether said actual wavelength of said upstream signal is within the subrange with respect to the target wavelength.

* * * * *